United States Patent
Alnabulsi et al.

(10) Patent No.: US 12,120,210 B2
(45) Date of Patent: Oct. 15, 2024

(54) TRACKING OF SAMPLING PHASE IN A RECEIVER DEVICE

(71) Applicant: Marvell Asia Pte Ltd, Singapore (SG)

(72) Inventors: Basel Alnabulsi, Ottawa (CA); Yu Liao, Santa Clara, CA (US); Benjamin Smith, Ottawa (CA); Jamal Riani, San Jose, CA (US)

(73) Assignee: Marvall Asia Pte Ltd, Singapore (SG)

( * ) Notice: Subject to any disclaimer, the term of this patent is extended or adjusted under 35 U.S.C. 154(b) by 126 days.

(21) Appl. No.: 17/993,776

(22) Filed: Nov. 23, 2022

(65) Prior Publication Data

US 2023/0171081 A1 Jun. 1, 2023

Related U.S. Application Data

(60) Provisional application No. 63/282,578, filed on Nov. 23, 2021.

(51) Int. Cl.
*H04L 7/00* (2006.01)
*H04L 7/033* (2006.01)

(52) U.S. Cl.
CPC ............ *H04L 7/0012* (2013.01); *H04L 7/033* (2013.01)

(58) Field of Classification Search
CPC ..... H04L 7/0012; H04L 7/033; H04L 7/0058; H04L 25/03019; H04L 7/0062
See application file for complete search history.

(56) References Cited

U.S. PATENT DOCUMENTS

| | | | |
|---|---|---|---|
| 10,110,319 B1 | 10/2018 | Hueda et al. | |
| 11,381,269 B1 | 7/2022 | Alnabulsi | |
| 11,398,931 B2 | 7/2022 | Wu et al. | |
| 2005/0169362 A1* | 8/2005 | Schenk | H04B 3/142 375/234 |
| 2007/0177479 A1* | 8/2007 | Tatsuzawa | G11B 20/10166 |
| 2008/0069198 A1 | 3/2008 | Bhoja et al. | |
| 2015/0179213 A1 | 6/2015 | Liao et al. | |

FOREIGN PATENT DOCUMENTS

| | | |
|---|---|---|
| EP | 0805447 A2 | 11/1997 |
| WO | 9727695 A2 | 7/1997 |
| WO | 2020147959 A1 | 7/2020 |

OTHER PUBLICATIONS

International Search Report and Written Opinion for PCT Application No. PCT/US2022/050969 mailed on Mar. 23, 2023 (14 pages).

* cited by examiner

*Primary Examiner* — Vineeta S Panwalkar

(57) ABSTRACT

An input signal is sampled at a current sampling phase by a sampler device of a receiver device. The sampled input signal is equalized by an adaptive equalizer of the receiver device. One or more parameters of the adaptive equalizer are adapted, based on the equalized input signal, under one or more adaptation constraints. Phase gradient information indicative of an offset of the current sampling phase from an optimal sampling phase is determined, and the one or more adaptation constraints of the adaptive equalizer are updated based on the phase gradient information to move the current sampling phase towards the optimal sampling phase.

20 Claims, 7 Drawing Sheets

TRACKING OF SAMPLING PHASE IN A RECEIVER DEVICE

CROSS REFERENCES TO RELATED APPLICATIONS

This application claims the benefit of U.S. Provisional Patent App. No. 63/282,578, entitled "Sampling of Phase Tracking in Communication Links," filed on Nov. 23, 2021, the disclosure of which is hereby expressly incorporated herein by reference in its entirety.

FIELD OF TECHNOLOGY

The present disclosure relates generally to communication links, and more particularly to optimization of sampling of signals received over communication links.

BACKGROUND

Data speeds in communication systems have increased greatly over the years. For example, data centers often utilize communication links that support 1-Gbit/s, 10-Gbits/s or even higher transmission speeds. When receiving high speed data over such communication links, the receiver typically samples the input signal at an optimal sampling phase that is found at startup. During operation, the sampling phase at the receiver is typically controlled by two loops: a clock data recovery (CDR) loop that aligns the sampling clock with timing recovered from the input signal and an adaptive equalizer that attempts to remove inter-symbol interference caused by transmission of the signal over the communication link. However, interaction between a nested CDR loop and adaptive equalization can lead to instability during operation of the receiver. When the CDR loop adjusts the sampling phase at which the input signal is sampled at the receiver, the adaptive equalizer adapts to the communication link with the new sampling phase, which can lead the sampling phase away from the optimal sampling phase for the input signal. One solution that has been employed to mitigate the instability due to interconnection between the CDR loop and adaptive equalization is to constrain adaptation of the adaptive equalizer, not allowing the adaptive equalizer to freely adapt to changes in the channel response of the communication link. However, constrained equalization causes considerable performance loss under certain operating conditions of the receiver due to dependency on process/voltage/temperature (PVT) changes experienced during operation by the receiver. For example, when the operating temperature of the receiver changes, the typical constrained adaptive equalizer is not able to adequately adapt to the new operating conditions and thus performance of the receiver is degraded.

SUMMARY

In an embodiment, a method for tracking a sampling phase in a receiver device includes: receiving an input signal at a sampler device of the receiver device; sampling, by the sampler device, the input signal to generate a sampled input signal, the input signal sampled at a current sampling phase corresponding to a sampling clock; equalizing, with an adaptive equalizer of the receiver device, the sampled input signal to generate an equalized input signal; adapting, with the adaptive equalizer based on the equalized input signal, one or more parameters of the adaptive equalizer, the adaptation of the one or more parameters being performed under one or more adaptation constraints; determining, by an adaptation constraint controller of the receiver device, phase gradient information indicative of an offset of the current sampling phase from an optimal sampling phase for the input signal, the optimal sampling phase corresponding to an estimated peak of the input signal; and updating, by the adaptation constraint controller, the one or more adaptation constraints of the adaptive equalizer based on the phase gradient information to move the current sampling phase towards the optimal sampling phase.

In another embodiment, a receiver device comprises: front end circuitry configured to receive an input signal; a sampler device configured to sample the input signal the input signal to generate a sampled input signal, the sampling being performed at a current sampling phase; an adaptive equalizer configured to: equalize the sampled input signal to generate an equalized input signal, and adapt, based at least in part on the equalized input signal, one or more parameters of the adaptive equalizer, the adaptation of the one or more parameters being performed under one or more adaptation constraints; and an adaptation constraint controller configured to: determine phase gradient information indicative of an offset of the current sampling phase from an optimal sampling phase for the receiver device, the optimal sampling phase corresponding to an estimated peak of the input signal, and update the one or more adaptation constraints of the adaptive equalizer based on the phase gradient information to move the current sampling phase of the receiver device towards the optimal sampling phase.

DETAILED DESCRIPTION

Figure 1:
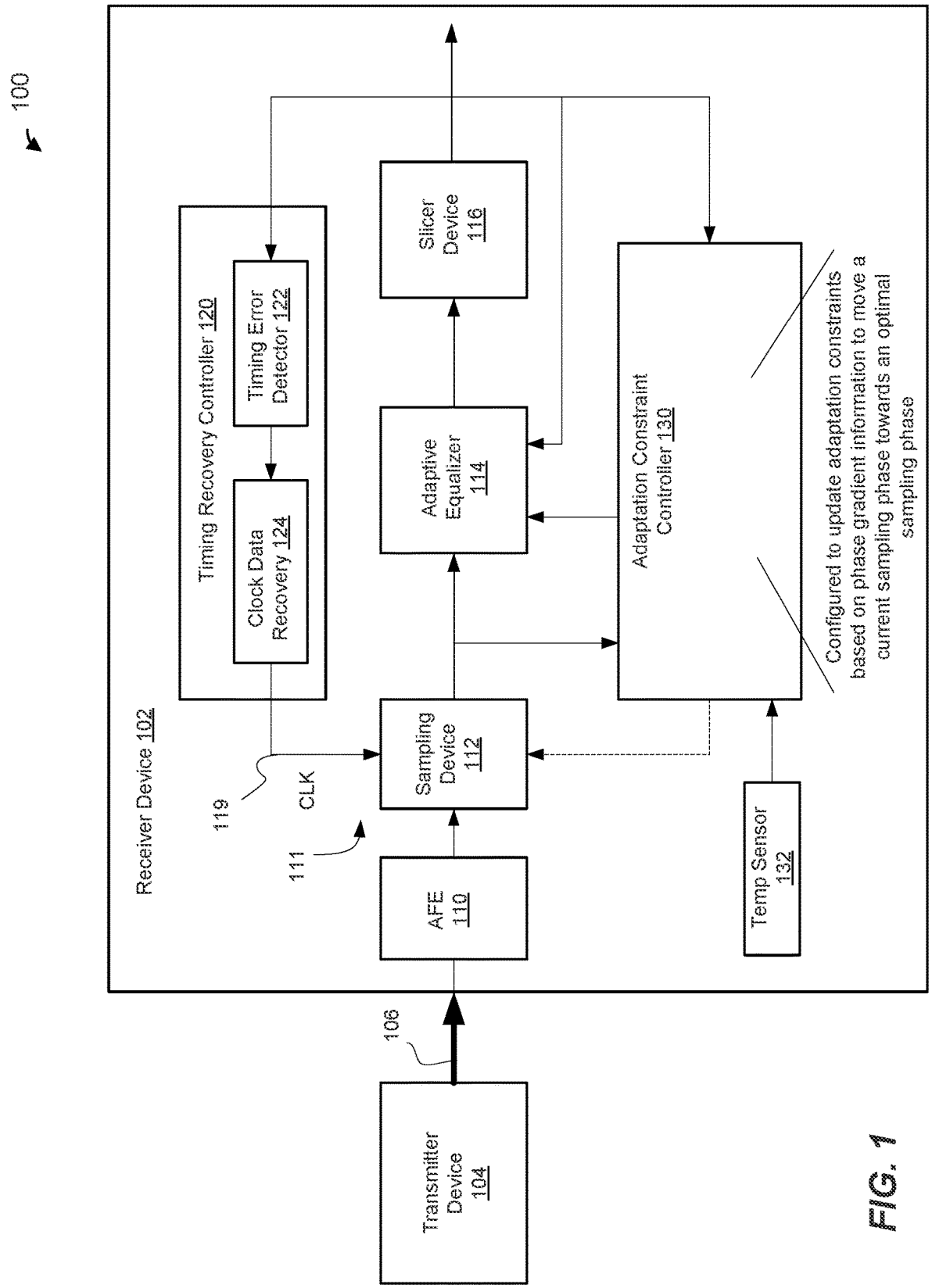
FIG. 1 is a block diagram of an example communication system in which a receiver device is configured to adjust constraints on adaptation of an equalizer based on tracking a sampling phase of an input signal, according to an embodiment.

In embodiments described below, a receiver device includes i) a sampler device, such as an analog to digital converter (ADC), configured to sample an input signal received by the receiver device from a transmitter device over a communication channel and ii) an adaptive equalizer configured to equalize the sampled input signal to remove inter-symbol interference caused by transmission of the signal over the communication channel. As described in more detail below, in an embodiment, the adaptive equalizer is configured to adjust values of one or more equalizer parameters, such as values of one or more equalizer taps, based on equalization errors during reception of an input signal, to adapt to changes in a channel response of the communication channel as the signal is transmitted over the communication channel. The receiver device also includes a timing recovery controller configured to recover timing information from the input signal and to adjust, based on the timing information recovered from the input signal, a sampling clock used by the sampler device to sample the input signal at the receiver device. Adjusting the sampling clock based on timing information recovered from the input signal aligns the sampling clock with a clock of the transmitter device and shifts the sampling phase at which the input signal is sampled at the receiver device in accordance with the clock aligned with the clock of the transmitter device, in an embodiment. However, without constraints on adaptation of the adaptive equalizer, when the timing recovery controller shifts the sampling phase at which the input signal is sampled at the receiver device, the adaptive equalizer adapts to the new sampling phase, which leads the sampling phase away from the optimal sampling phase for the input signal at the receiver device. In an embodiment, to prevent such interaction between sampling phase adjustments by the timing recovery controller and adaptation by the adaptive equalizer, one or more degrees of freedom in adaptation of the adaptive equalizer are constrained at the receiver device. For example, coefficients of one or more taps of the adaptive equalizer are "pinned" to particular values that are determined, for example, at start-up of the receiver device and are not allowed to freely adapt during operation of the receiver device. While constraining adaptation of the adaptive equalizer prevents interaction between adaptive equalization and timing recovery shifting the sampling phase at the receiver device away from the optimal sampling phase, constraining of adaptation of the adaptive equalizer does not allow adequate adaptation by the adaptive equalizer in some situations, such as under changing operating conditions (e.g., temperature changes) experienced by the receiver device, which results in degradation of performance of the receiver device in such situations.

In an embodiment, the receiver device includes an adaptation constraint controller configured to track the sampling phase of the receiver device at or near an optimal sampling phase for the input signal (e.g., at or near an estimated peak of the input signal) based on phase gradient information determined, by the adaptation constraint controller, based on the input signal during reception of the input signal by the receiver device. In an embodiment, the adaptation constraint controller is configured to track the sampling phase of the receiver device at or near an optimal sampling phase for the input signal by updating one or more adaptation constraints of the adaptive equalizer based on the phase gradient information that the adaptation constraint controller determines based on the input signal during reception of the input signal by the receiver device. For example, in an embodiment, the adaptation constraint controller is configured to adjust values of one or more constrained coefficients of the adaptive equalizer based on the phase gradient information that the adaptation constraint controller determines based on the input signal during reception of the input signal by the receiver device. Updating one or more adaptation constraints of the adaptive equalizer based on the phase gradient information causes the timing recovery controller to shift the sampling phase of the receiver towards the optimal sampling phase for the input signal, in an embodiment.

In another embodiment, the adaptation constraint controller is configured to track the sampling phase at or near the optimal sampling phase for the input signal by temporarily switching the timing recovery controller to perform timing recovery from a channel response estimate of the communication channel determined based on the input signal, rather than the input signal itself, to cause the timing recovery controller to move the sampling phase towards the optimal sampling phase for the input signal while allowing the adaptive equalizer to freely adapt to the communication channel. Thus, in this embodiment, the adaptation constraint controller forces the timing recovery controller to directly track the optimal sampling phase for the input signal based on the channel response estimate determined based on the input signal. In an embodiment, the adaptation constraint controller is configured to continue determining the phase gradient information based on the input signal as the sampling phase is being shifted towards the optimal sampling phase. Once the phase gradient information that is determined based on tracking the input signal indicates that the sampling phase has moved sufficiently close to the optimal sampling phase for the input signal, the adaptation constraint controller switches the timing recovery controller to perform timing recovery based on the input signal, and re-constrains the adaptive equalizer to the values to which the adaptive equalizer adapted when allowed to freely adapt to the communication channel, in an embodiment. These and other techniques described herein allow the receiver device to adapt to changes in operating conditions of the receiver device, such as changes in operating temperature of the receiver device, while still preventing undesired interaction between the sampling phase correction by the timing recovery controller and adaptation by the adaptive equalizer that would degrade performance of the receiver device, in various embodiments.

FIG. 1 is a block diagram of an example communication system 100 in which a receiver device 102 is configured to track a sampling phase at or near an optimal sampling phase for an input signal based on phase gradient information determined by the receiver device based on the input signal, according to an embodiment. The communication system 100 includes the receiver device 102 communicatively coupled to a transmitter device 104 via a communication link 106. In an embodiment, the receiver device 102 and the transmitter device 104 are parts of switching or host devices employed in a datacenter, for example for transmission and reception of high-speed data by devices in the datacenter. In other embodiments, the transmitter device 102 and/or the receiver device 104 are transmitter/receiver devices employed in suitable communications networks other than in a datacenter. In an embodiment, the communication link 106 comprises an optical communication link, such as a fiber communication link suitable for transmission of high-speed data. In other embodiments, the communication link 106 comprises other suitable types of communication links, such other suitable types of optical communication links, a wired communication link, a wireless communication link, etc.

The receiver device 102 is illustrated in FIG. 1 as including an analog front end (AFE) circuitry 110 coupled to a receiver branch 111. The receiver branch 11 includes a sampler device 112, an adaptive equalizer 114, and a slicer device 116, in the illustrated embodiment. The analog front end device 110 implements one or more components configured to improve reception of signals and/or condition signals received by the receiver device 102 prior to the signals being sampled by the sampler device 112, in an embodiment. In various embodiments, the one or more components implemented in the AFE circuitry 110 include one or more of a tunable termination block configured to minimize reflections at the input to the receiver device 102, a continuous time linear equalizer (CTLE) configured to provide a frequency boost to the input signal, one or more gain amplifiers (e.g., variable gain amplifiers), etc.

The sampler device 112 is configured to receive the input signal from the AF 110 and sample the input signal to generate a sampled version of the input signal. The sampler device 112 comprises one or more track and hold (T&H) circuits, one or more sample and hold (S&H) circuits, one or more analog to digital converters (ADC), etc., configured to sample the input signal, in various embodiments. In an embodiment, the sampler device 112 is generally configured to sample the input signal with a sampling frequency that corresponds to the baud rate of the input signal, thus obtaining a single sample per symbol. The adaptive equalizer 114 is configured to equalize the sampled input signal to remove inter-symbol interference caused by transmission of the signal over the communication link 106, in an embodiment. In an embodiment, the adaptive equalizer 114 comprises a feed forward equalizer (FFE) or another suitable type of adaptive equalizer. The slicer device 116 is configured to slice the input signal equalized by the adaptive equalizer 114, to make decisions on symbols transmitted by the transmitter device 104, in an embodiment.

Although only a single receiver branch 111, comprising a single sampler device 112, a single adaptive equalizer 114 and a single slicer device 116, is illustrated in FIG. 1, the receiver device 102 includes a plurality of receiver branches 111, each receiver branch 111 including a respective sampling branch in the sampler device 112, a respective adaptive equalizer branch in the adaptive equalizer 114 and a respective slicer branch in the slicer device 116, in some embodiments. In an embodiment, the plurality of receiver branches 111 operate in parallel to generate and process samples of the input signal in time-interleaved manner such that each of the respective receiver branches 111 operates at a clock rate that is a fraction of the overall sampling frequency of the receiver device 102. For example, in an embodiment, the sampler device 112 includes a plurality of time interleaved sampling branches, such as a plurality of track and hold circuit branches, each comprising a track and hold circuit that is clocked at a rate that is a fraction of the sampling frequency of the receiver device 102. As a more specific example, the sampler device 112 comprises an ADC having N (e.g., 16, 32, 64, etc.) track and hold circuits each sampling at a sampling frequency that is 1/N of the sampling frequency of the receiver device 102. The input signal samples generated by the respective sampling branches of the sampler device 112 are provided to respective equalizer branches of the adaptive equalizer 114 and are equalized in by the respective adaptive equalizers in the equalizer branches of the adaptive equalizer 114. The equalized input signals are provided to respective slicer branches of the slicer device 116, and are sliced by respective slicers in the slicer branches of the slicer dev device 116 to generate corresponding decisions. The decisions made in the respective slicer branches of the slicer device 116 are then time-interleaved to generate output stream comprises decisions on data transmitted by the transmitter device 104, such as a symbol or bit stream corresponding to a symbol or bit stream that was most likely transmitted by the transmitter device 104, in various embodiments. Example configurations of receiver devices having a plurality of time inter-leaved receiver branches, according to some embodiments, are described in more detail below in connection with FIGS. 2 and 4.

Referring still to FIG. 1, the receiver device 102 also includes a timing recovery controller 120 which, in turn, includes a timing error detector 122 and a clock and data recovery (CDR) circuit 124. In an embodiment, the timing error detector 122 is configured to determine a timing error of the sampling clock of the receiver device 102 based on the decisions and errors generated by the slicer device 116. For example, the timing error detector is configured to generate an error signal indicative of an offset between a sampling point at which the input signal is sampled and a desired or optimal sampling point for the input signal using the decisions and errors generated by the slicer device 116 based on the equalized input signal, in an embodiment. The CDR circuit 124 is configured to adjust a clock signal 119 based on the error signal generated by the timing error detector 122 to shift the sampling phase of the receiver device to the desired or optimal sampling phase for the input signal, in an embodiment.

As discussed above, without constraints on adaptation of the adaptive equalizer 114, when the timing recovery controller 120 shifts the sampling phase of the input signal, the adaptive equalizer 114 adapts to the new sampling phase. This interaction between sampling phase correction by the timing recovery controller 120 and unconstrained adaptation by the adaptive equalizer 114 leads the receiver away from the actual optimal sampling phase of the input signal and results in decreasing the size of the eye at the receiver device 102, in at least some situations. In an embodiment, to prevent such interaction between the sampling phase correction by the timing recovery controller 120 and adaptation by the adaptive equalizer 114, adaptation of the adaptive equalizer 114 is constrained at the receiver device 102. For example, coefficients of one or more taps of the adaptive equalizer 114 are "pinned" to particular values that are determined, for example, at start-up of the receiver device 102 and are not allowed to freely adapt during operation of the receiver device 102. However, with constraints imposed on adaptation of the adaptive equalizer 114, the adaptive equalizer 114 is unable to adequately adapt to changing operating conditions of the receiver device 102, such as changes of the channel response due to changing operating temperature of the receiver device 102, in at least some embodiments.

In an embodiment, the receiver device 102 includes an adaptation constraint controller 130 configured to determine phase gradient information based on the input signal and to update adaptation constraints on one or more degrees of freedom (e.g., tap coefficients) in the adaptive equalizer 114 based on the phased gradient information to track the sampling phase of the sampler device 112 at or near optimal sampling phase for the input signal during operation of the receiver device 102. In an embodiment, the phase gradient information determined by the adaptation constraint controller 130 is indicative of an offset of the current sampling phase at which the input signal is sampled by the sampler device 112 from an optimal sampling phase for the input signal corresponding, for example, to an estimated peak of the input signal. For example, the phase gradient information determined by the adaptation constraint controller 130 indicates one or both of i) whether the current sampling phase is sufficiently close to the optimal sampling phase for the input signal and ii) a direction in which the one or more adaptation constraints of the adaptive equalizer 114 should be adjusted to cause the sampling phase to shift towards the optimal sampling phase for the input signal. In some embodiments, the adaptation constraint controller 130 is configured to determine the phase gradient information by measuring performance of the receiver device 102 with the input signal sampled at the current sampling phase and at one or more sampling phases skewed with respect to the current sampling phase, and determining whether performance of the receiver device 102 improves, or gets worse, when the input signal is sampled at the one or more sampling phases skewed with respect to the current sampling phase. In an embodiment, the adaptation constraint controller 130 is configured to successively un-constrain adaptation of equalizer branches of the adaptive equalizer 114 while measuring the performance of the corresponding receiver branches 111 of the receiver device 102 with the input signal sampled at the receiver branches at the current sampling phase and at one or more sampling phases skewed with respect to the current sampling phase, and determine a direction in which to adjust the one or more adaptation constraints based on a direction in which the unstrained components shifted, on average, to cause improved performance of the respective receiver branches 111. In an embodiment, the adaptation constraint controller 130 is configured to update the adaptation constraints of the adaptive equalizer 114 by adjusting the current values of one or more taps of the adaptive equalizer 114 in the determined direction to cause the timing recovery controller 120 to shift the sampling phase towards the optimal sampling phase for the input signal. An example receiver device configured to determine phase gradient information by measuring performance of the receiver device with the input signal sampled at the current sampling phase and at one or more sampling phases skewed with respect to the current sampling phase, according to an embodiment, is described in more detail below in connection with FIG. 2.

In other embodiments, the adaptation constraint controller 130 is configured to determine the phase gradient information by determining a current channel response estimate corresponding to the input signal sampled at the current sampling phase and one or more skewed channel response estimates corresponding to the input signal sampled at one or more sampling phases skewed relative to the current sampling phase, and determining the phase information as function of the current channel response estimate and the one or more skewed channel response estimates. In an example embodiment, the adaptation constraint controller 130 is configured to determine the current channel response estimate by i) obtaining first samples of the input signal at the current sampling phase and ii) convolving the first samples of the input signal with corresponding transmitted symbol decisions made by the sampler device 116, and to determine the one or more skewed channel response estimates by i) obtaining second samples of the input signals at the one or more sampling phases skewed relative to the current sampling phase and ii) convolving the second samples of the input signal with the corresponding transmitted symbol decisions made by the sampler device 116. In an embodiment, as described in more detail below in connection with FIG. 4, the adaptation constraint controller 130 is configured to obtain the second samples of the input signal by skewing a sampling clock of a sampling branch of the receiver device 102 with respect to the current sampling clock, and obtaining the second samples of the input signal with the sampling clock of the sampling branch skewed with respect to the current sampling clock. In another embodiment, as described in more detail below in connection with FIG. 5, the adaptation constraint controller 130 is configured to obtain the second samples of the input signal by interpolating between first samples obtained at the current sampling phase to estimate the second samples at the one or more sampling phases skewed with respect to the current sampling phase, without physically skewing the sampling clock.

In an embodiment, the adaptation constraint controller 130 is configured to determine a direction in which to adjust the one or more adaptation constraints of the adaptive equalizer 114 as a function of the current channel response estimate and the one or more skewed channel response estimates. For example, the adaptation constraint controller 130 is configured to determine the direction to be opposite from a direction of a slope of the channel response at the current sampling phase, where the direction of the slope is determined based on identifying a maximum one among i) a main tap of the current channel response estimate corresponding to the current sampling phase, ii) a main tap of a first skewed channel response estimate corresponding to a sampling phase skewed in a first direction relative to the current sampling phase, and iii) a main tap of a second skewed channel response estimate corresponding a sampling phase skewed in a second direction relative to the current sampling phase. The adaptation constraint controller 130 is configured to update the one or more adaptation constraints of the adaptive equalizer 114 by adjusting values of the one or more adaptation constraints by a predetermined adaptation step in the determined direction to cause the timing recovery controller 120 to shift the sampling phase towards the optimal sampling phase for the input signal, in an embodiment.

Figure 6:
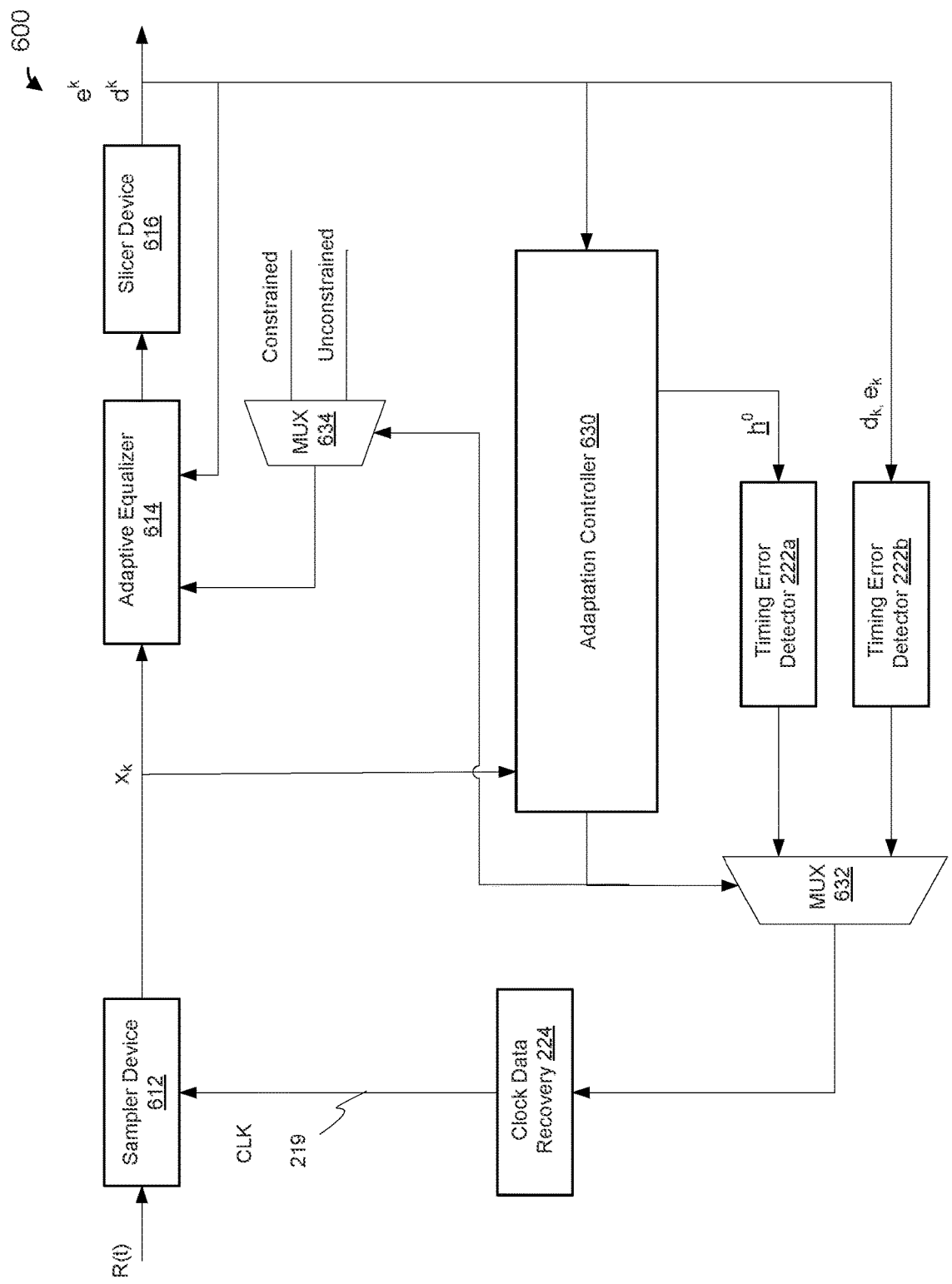
FIG. 6 is a block diagram of a receiver device configured to adjust constraints on adaptation of an equalizer based on tracking a sampling phase of an input signal, according to another embodiment.

In another embodiment, as discussed in more detail below in connection with FIG. 6, the adaptation constraint controller 130 is configured to track the sampling phase at or near the optimal sampling phase for the input signal by temporarily switching the timing recovery controller 120 to recover timing from a channel response estimate determined based on the input signal, rather than the input signal itself, to cause the timing recovery controller 120 to move the sampling phase towards the optimal sampling phase for the input signal, while allowing the adaptive equalizer to freely adapt to the communication channel. The adaptation constraint controller 130 is configured to continue tracking phase gradient information based on the input signal as the sampling phase is being shifted towards the optimal sampling phase. Once the phase gradient information that is determined based on the input signal indicates that the sampling phase has moved to, or sufficiently close to, the optimal sampling phase, the adaptation constraint controller 130 switches the timing recovery controller 120 to perform timing recovery based on the input signal, and updates the adaptation constraints of the adaptive equalizer 114 by re-constraining the adaptation constraints to the values to which the previously constrained degrees of freedom adapted during free adaptation by the adaptive equalizer 114, in an embodiment. Thus, the adaptation constraint controller 130 forces the timing recovery controller 120 to shift the sampling phase to the optimal sampling phase and allows the adaptive equalizer to free adapt to the communication channel, while breaking the undesired interaction between the sampling phase correction by the timing recovery controller 120 and adaptation by the adaptive equalizer 114, in an embodiment.

In at least some embodiments, the adaptation constraint controller 130 is configured to obtain the phase gradient information, indicative of the offset of the current sampling phase from an optimal sampling phase for input signal, without perturbing the data path of the input signal in the receiver device 102. For example, as will be explained in more detail below, in some embodiments, the adaptation constraint controller 130 is configured to obtain the phase gradient information by successively skewing the clock of respective sampling branches of the sampler device 112 while disabling contribution of errors generated by the corresponding slicer device 116 to the timing recovery performed by the timing recovery controller 120. In another embodiment, the sampler device 112 includes an additional sampling circuit, such as an additional track and hold circuit, that is not used for sampling the input signal in the data path of the receiver device 102, and the adaptation constraint controller 130 is configured to obtain the phase gradient information by skewing the sampling clock of the additional sampling circuit that is not used for sampling the input signal in the data path of the receiver device 102. In yet another embodiment, as discussed above, the adaptation constraint controller 130 is configured to perform digital signal processing to obtain phase gradient information based on interpolation and without physically skewing the sampling clock of the receiver device 102.

In some embodiments, the adaptation constraint controller 130 is configured to continually track the sampling phase of the receiver device 102 during operation of the receiver device 102. In other embodiments, the adaptation constraint controller 130 is triggered to track the sampling phase only under certain operating conditions, such as changing temperature during operation of the receiver device 102. As just an example, the receiver device 102 includes a temperature sensor 132 configured to detect temperature during operation of the receiver device 102, and the adaptation constraint controller 130 is configured to trigger operations related to determining phase gradient information and updating adaptation constraints of the adaptive equalizer 114 based on the phase gradient information at certain temperature(s) detected by the temperature sensor 132. In some embodiments, the adaptation constraint controller 130 includes or is coupled to a memory (not illustrated in FIG. 1) configured to store the adaptation constraints updated by the adaptation constraint controller 130 in association with operating conditions, such as temperatures detected by the temperature sensor 132, at which the updates are made by the adaptation constraint controller 130. In an embodiment, the adaptation constraint controller 130 is configured to subsequently retrieve the adaptation constraints from the memory when the corresponding temperatures are detected by the temperature sensor 132, and to update the adaptation constraints accordingly without re-determining the corresponding phase gradient information. These and other techniques described herein enable the receiver device 102 to accurately and efficiently track the sampling phase at or near an optimal point for the input signal, and allow the receiver device 102 to adequately adapt to changing operating conditions, while still constraining adaptation of the adaptive equalizer 114 and preventing undesired interaction between the sampling phase correction by the timing recovery controller 120 and adaptation by the adaptive equalizer 114 that would degrade performance of the receiver device 102, in various embodiments.

Figure 2:
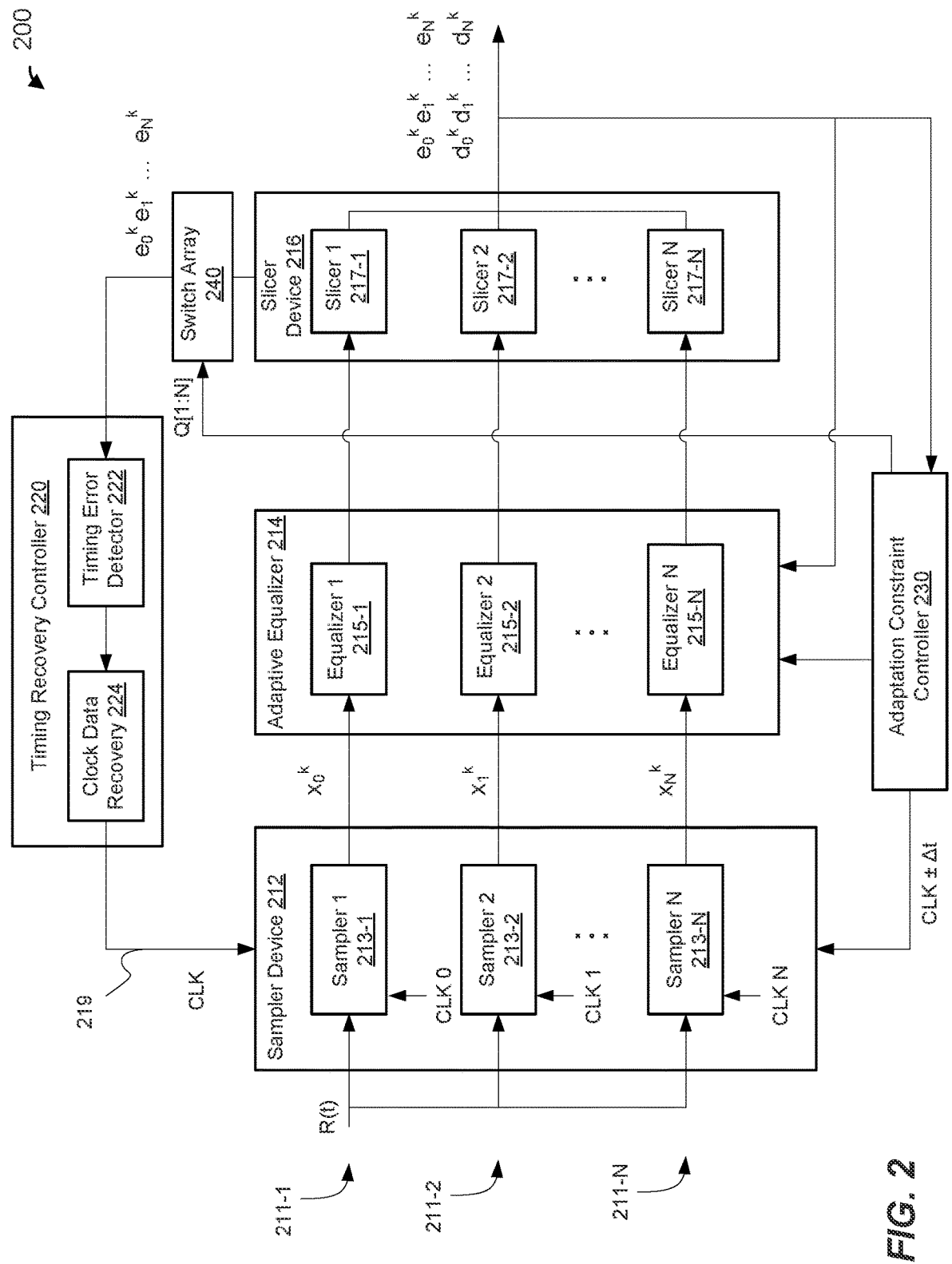
FIG. 2 is a block diagram of a receiver device configured to adjust constraints on adaptation of an equalizer based on tracking a sampling phase of an input signal, according to an embodiment.

FIG. 2 is a block diagram of a receiver device 200, according to an embodiment. In an embodiment, the receiver device 200 corresponds to the receiver device 102 of FIG. 1, and the receiver device 200 is described with reference to FIG. 1 for case of explanation. In other embodiments, the receiver device 200 is utilized with communication systems different from the communication system 100 of FIG. 1. Similarly, the receiver device 102 of the communication system 100 of FIG. 1 is different from the receiver device 200, in some embodiments. The receiver device 200 includes like-numbered elements with the receiver device 102 of FIG. 1 which are not described in detail for brevity.

The receiver device 200 includes a sampler device 212 corresponding to the sampler device 112 of FIG. 1, an adaptive equalizer 214 corresponding to the adaptive equalizer 114 of FIG. 1 and a slicer device 216 corresponding to the slicer device 116 of FIG. 1. The receiver device 200 also includes a timing recovery controller 220 corresponding to the timing recovery controller 120 of FIG. 1. The timing recovery controller 220 includes a timing error detector 222 corresponding to the timing error detector 122 of FIG. 1 and a clock data recovery circuit 224 corresponding to the clock data recovery circuit 124 of FIG. 1.

In the embodiment of FIG. 2, each of the sampler device 212, the adaptive equalizer 214 and the slicer device 216 comprises a plurality of branches forming a corresponding plurality of receiver branches 211 of the receiver device 200. For example, the receiver device 200 includes N receiver branches 211, where N is 16, 32, 64, etc., in various embodiments. Accordingly, the sampler device 212 includes N sampling branches (e.g., track and hold circuits) 213, the equalizer device 214 includes N equalizer branches 215 and the slicer device 216 includes N slicer branches 217, in an embodiment. The receiver branches 211 operate in time-interleaved manner to sample and process an input signal r(t), in an embodiment. For example, the respective sampling branches 213 of the sampler device 212 are clocked by respective clock signals, generated by shifting a sampling clock 219 of the receiver device 200, to generate samples $x_0^k, x_1^k, \ldots, x_N^k$ of the input signal r(t), in an embodiment. The respective clock signals that drive respective sampling branches 213 are successively shifted with respect to one another to achieve time-interleaved sampling of the input signal r(t), in an embodiment. Each sampling branch 213 thus operates at a rate that is 1/N of the baud rate of the input signal r(t), in an embodiment.

The samples $x_0^k, x_1^k, \ldots, x_N^k$ generated by the sampling branches 213 of the sampler device 212 are provided to respective equalizers in the equalizer branches 215 of the adaptive equalizer 214, in an embodiment. The respective equalizers in the equalizer branches 215 operate to equalize samples of the input signal r(t) to remove or minimize inter-symbol interference from the samples of the input signal r(t). The samples equalized by the respective equalizers in the equalizer branches 215 are provided to respective slicer branches 217 of the slicer device 216. The respective slicer branches 217 generate decisions on transmitted symbols based on comparing the equalized samples of the input signal r(t) to a threshold voltage, for example. Although each slicer branch 217 is illustrated in FIG. 2 as comprising a single slicer, each slicer branch 217 includes multiple slicers that compare the equalized samples of the input signal r(t) to different threshold voltages, in some embodiments. The decisions generated by the slicer branches 217 are combined in time-interleaved manner to generate an output of the slicer device 216 comprising a stream of decisions $d_0^k, d_1^k, \ldots, d_N^k$, where $d_0^k$ is a decision corresponding to the sample $x_0^k$ generated by the sampling branch 213-1 of the sampler device 212, $d_1^k$ is a decision corresponding to the sample xx generated by the sampling branch 213-2 of the sampler device 212, and so on, in an embodiment. In an embodiment, the slicers in the slicer branches 217 are additionally configured to output errors associated with the respective decisions $d_0^k, d_1^k, \ldots, d_N^k$.

The output of the slicer device 216 thus additionally includes a stream of errors $e_0^k, e_1^k, \ldots, e_N^k$ corresponding to the steam of decisions $d_0^k, d_1^k, \ldots, d_N^k$, where an error $e_i^k$ indicates (e.g., is proportional to) a difference between a decision $d_i^k$ and a signal level (e.g., voltage level) at an output of the equalizer branch 215 based on which the decision $d_i^k$ was made, in an embodiment. The stream of errors $e_0^k, e_1^k, \ldots, e_N^k$ is provided to the timing recovery controller 220 which, in turn, detects a timing error based on the stream of errors $e_0^k, e_1^k, \ldots, e_N^k$ and adjusts the sampling clock 219 based on the timing error to reduce or minimize the errors at the output of the slicer device 216, in an embodiment.

In an embodiment, the adaptive equalizers in the equalizer branches 215 are configured to adapt one or more degrees of freedom, such as on or more tap coefficients, of the equalizers in the equalizer branches 215 to minimize errors at the output of the equalizers in the equalizer branches 215. As discussed above, in embodiments, adaptation of the one or more degrees of freedom in the equalizers 215 is constrained to prevent undesired interaction between sampling phase correction by the timing recovery controller 220 and unconstrained adaptation by the equalizers in the equalizer branches 215 leading away from the optimal sampling phase of the input signal r(t) during operation of the receiver device 200. However, as discussed also above, constraining adaptation of the equalizers in the equalizer branches 215 does not allow the adaptive equalizer 214 to adequately adapt to changing operating conditions, such as operating temperature, of the receiver device 200 in some situations, in an embodiment.

In an embodiment, the receiver device 200 includes an adaptation constraint controller 230. The adaptation constraint controller 230 corresponds to the adaptation constraint controller 130 of FIG. 1, in an embodiment. The adaptation constraint controller 230 is configured to track the sampling phase of the input signal r(t) at or near an optimal sampling phase for the input signal r(t) using phase gradient information determined by the adaptation constraint controller 230 based on samples of the input signal r(t) during reception of the signal r(t) by the receiver device 200, in an embodiment. The adaptation constraint controller 230 is configured to track the sampling phase of the input signal r(t) at or near an optimal sampling phase for the input signal r(t) by updating the adaptation constraints of the equalizers in the equalizer branches 215 based on the phase gradient information during reception of the input signal r(t) by the receiver device 200, in an embodiment. Updating constraints on the one or more constrained degrees of freedom of the equalizers 213 temporarily increases magnitudes of the errors at the output of the slicer device 216 and, in turn, causes the timing recovery controller 220 to shift the sampling clock 219 towards the optimal phase of sampling the input signal r(t), in an embodiment.

In an embodiment, the adaptation constraint controller 230 is configured to determine the phase gradient information by successively skewing timing of the clock signals of respective receiver branches 211 relative to the timing of the current sampling clock while temporarily un-constraining adaptation of the equalizers in the equalizer branches 215 of the corresponding receiver branches 211 and measuring performance of the corresponding receiver branches 211, in an embodiment. For example, the adaptation constraint controller 230 is configured to calculate or otherwise obtain performance metrics, such as signal to noise ratio (SNR), bit error rate (BER), pulse response, etc., for the receiver branches 211 with i) the input signal r(t) sampled at the current sampling phase using the current clock signal and ii) with the input signal r(t) sampled at one or more sampling phases skewed relative to the current sampling phase using the skewed clock signals, in an embodiment. As a more specific example, in an embodiment, the adaptation constraint controller 230 is configured to calculate or otherwise obtain performance metrics for each receiver branch 211 i) with the input signal r(t) sampled at the current sampling phase using the current sampling clock of the receiver branch 224, ii) with the input signal r(t) sampled at a sampling phase shifted to the right of the current sampling phase using the clock signal shifted in time by a predetermine amount $\Delta t$, and iii) with the input signal r(t) sampled at a sampling phase shifted to the left of the current sampling phase using the clock signal shifted in time by a predetermine amount $-\Delta t$. As described in more detail below, the adaptation constraint controller 230 is configured to update constraints on one or more degrees of freedom for adaptation of the equalizers in the equalizer branches 215 based on whether performance of the receiver branches 211 is improved, on average, with the with the input signal r(t) sampled at a sampling phase shifted to the right of the current sampling phase using the clock signal shifted in time by a predetermine amount $\Delta t$ or with the input signal r(t) sampled at a sampling phase shifted to the left of the current sampling phase using the clock signal shifted in time by a predetermine amount $-\Delta t$, in an embodiment.

In embodiments, the adaptation constraint controller 230 is configured to skew the sampling clocks of the respective receiver branches 211, and to obtain performance metrics for the respective branches 211, without causing interaction between errors generated in the corresponding slicer branches 217 with timing recovery performed by the timing recovery controller 220. For example, in an embodiment, while skewing the sampling clocks and obtaining the performance metrics of the respective receive branches 211, the adaptation constraint controller 230 is configured to disable contribution of the corresponding receiver branches 213 to timing recovery performed by the timing recover controller 220. In an embodiment, the slicer device 216 includes or is coupled to a switch array 240 comprising an array of ON/OFF switches configured to connect/disconnect outputs of the slicers in the slicer branches 217 from the timing recovery controller 220, and the adaptation constraint controller 230 is configured to enable/disable contribution of the respective slicers in the slicer branches 217 using a control vector Q[0:N] that controls the ON/OFF switches of the switch array 240. More specifically, in an embodiment, the adaptation constraint controller 230 is configured to disconnect a particular receiver branch 211 from contributing to timing recovery performed by the timing recovery controller 220 by turning "OFF" the switch that connects the output of corresponding slicer branch 217 to the timing recovery controller 220 while the other slicer branches 217 remain connected to the timing recovery controller 220, in an embodiment.

Figure 3:
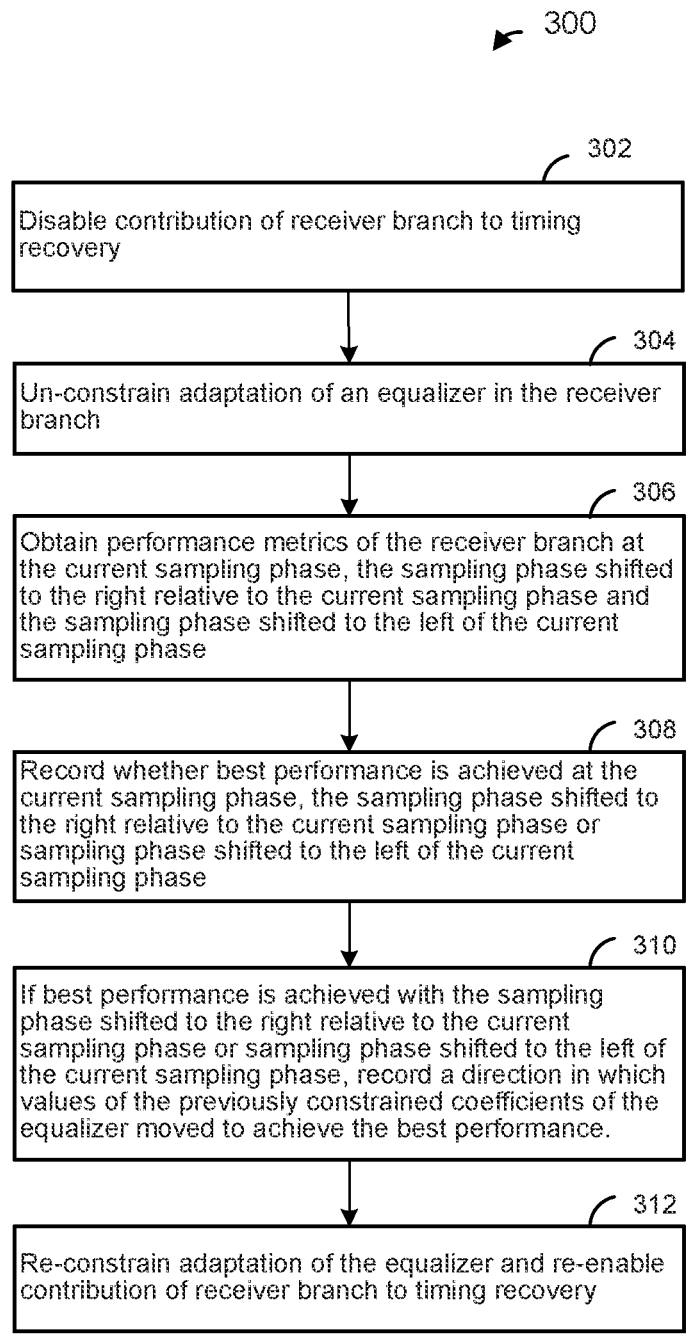
FIG. 3 is a flowchart of a process performed by the receiver device of FIG. 2 configured to obtain metrics for respective receiver branches of the receiver device of FIG. 2, according to an embodiment.

Referring briefly to FIG. 3, the adaptation constraint controller 230 is configured to implement a process 300 to obtain or otherwise calculate metrics for the respective receiver branches 211 and to determine phase gradient information for the respective receiver branches 211, in an embodiment. The process 300 begins at a block 302, at which the adaptation constraint controller 230 disables contribution of a first receiver branch 211 (e.g., the receiver branch 211-1) to timing recovery performed by the timing recovery controller 220. For example, the adaptation constraint controller 230 utilizes the vector Q[0:N] as discussed above, with the value of Q[1] set to a value (e.g., 0) that turns OFF the switch that connects the output of the slicer branch 217-1 to the timing recovery controller 220 while the values of the remaining Q[2:N] set to a value (e.g., 1) that turns ON the switches that connect the outputs of the remaining slicer branches 217-2-217-N to the timing recovery controller 220.

At block 304, while the first receiver branch 211 is disconnected from the timing recovery controller 220, the adaptation constraint controller 230 un-constrains the equalizer in the equalizer branch 215 of the first receiver branch 211 to allow free adaptation by the equalizer in the equalizer branch 215. At block 306, the adaptation constraint controller 230 calculates or otherwise obtains a performance metric of the first receiver branch 211 with i) the input signal r(t) sampled at the current sampling phase corresponding to the current sampling clock of the first receiver branch 211, ii) the input signal r(t) sampled at a sampling phase shifted to the right relative to the current sampling phase, with the sampling clock of the first receiver branch 211 skewed by a predetermine amount Δt and iii) the input signal r(t) sampled at a sampling phase shifted to the left relative to the current sampling phase, with the sampling clock of the first receiver branch 211 skewed by a predetermine amount −Δt. The performance metrics calculated or otherwise obtained by the adaptation constraint controller 230 at block 306 include one or more of signal to noise ratio (SNR) at the output of the particular receiver branch 211, a bit error rate in the particular receiver branch 211, a pulse response (PR) of the particular receiver branch 211, a number of tail hits collected on a histogram at a given error rate in the particular receiver branch 211, etc., in various embodiments. In other embodiments, other suitable performance metrics are additionally or alternatively utilized.

At block 308, based on the performance metrics obtained at block 306, the adaptation constraint controller 230 determines and records (e.g., stores an indication in a register, a memory, etc.) whether relatively better performance of the first receiver branch 211 is achieved at the current sampling phase in the first receiver branch 211, with the sampling phase shifted to the right relative to the current sampling phase in the first receiver branch 211 or with the sampling phase shifted to the left relative to the current sampling phase in the first receiver branch 211. Additionally, at block 310, if the relatively better performance of the first receiver branch 211 is achieved with the sampling phase shifted to the right relative to the current sampling phase in the first receiver branch 211 or with the sampling phase shifted to the left relative to the current sampling phase in the first receiver branch 211, the adaptation constraint controller 230 records (e.g., stores an indication in a register, a memory, etc.) a direction (e.g., up or down) in which values of the previously constrained one or more coefficient of the equalizer in the equalizer branch 215 of the first receiver branch 211 adapted to achieve the relatively better performance of the particular receiver branch 211.

At block 312, the adaptation constraint controller 230 re-constrains adaptation of the equalizer in the equalizer branch 215 in the first receiver branch 211 and re-enables contribution of the first receiver branch 211 to timing recovery performed by the timing recovery controller 220. The adaptation constraint controller 230 then performs the process 300 with a second receiver branch 211 (e.g., 211-2), and so on, until the adaptation constraint controller 230 completes the process 300 with respect to all of the receiver branches 211, in an embodiment.

Referring back to FIG. 2, when the adaptation constraint controller 230 completes the process 300 with respect to all of the receiver branches 211, the adaptation constraint controller 230 determines whether, on average, relatively better performance of the receiver branches 211 is obtained at the current sampling phase, the sampling phase shifted to the left of the current sampling phase or the sampling phase shifted to the right of the current sampling phase. In response to determining that, on average, relatively better performance of the receiver branches 211 is obtained at the sampling phase shifted to the left with respect to the current sampling phase or the sampling phase shifted to the right of the current sampling phase, the adaptation constraint controller 230 adjusts values of the one or more constrained coefficients in each equalizer branch 215 in the direction associated with the relatively better performance, to cause the timing recovery controller 220 to adjust the sampling clock of the receiver device 200 accordingly, in an embodiment. For example, the adaptation constraint controller 230 adjusts the values of the one or more constrained coefficients of equalizers in each equalizer branch 215 by shifting the current values of the one or more constrained coefficients by a predetermined adaptation step in the direction associated with the relatively better performance, in an embodiment. In other embodiments, the adaptation constraint controller 230 adjusts values of the one or more constrained coefficients of equalizers in each equalizer branch 215 in the direction associated with the relatively better performance in other suitable manners. Adjusting the values of the one or more constrained coefficients of equalizers in each equalizer branch 215 in the direction associated with the relatively better performance causes the timing recovery controller 220 to adjust the sampling clock 219 accordingly to move the sampling phase towards the optimal sampling phase for the input signal r(t), in an embodiment.

Figure 4:
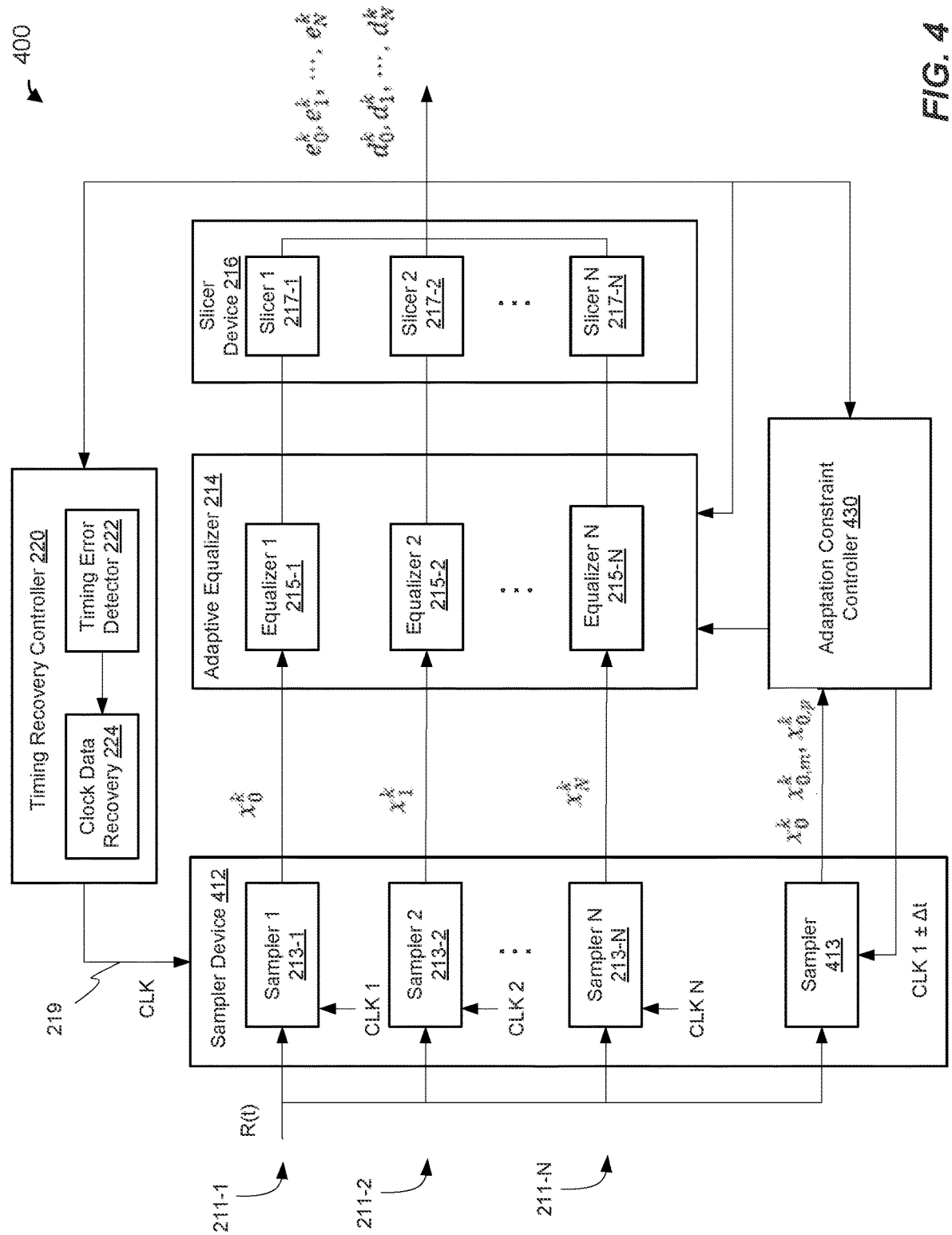
FIG. 4 is a block diagram of a receiver device configured to adjust constraints on adaptation of an equalizer based on tracking a sampling phase of an input signal, according to another embodiment.

FIG. 4 is a block diagram of a receiver device 400, according to an embodiment. In an embodiment, the receiver device 400 corresponds to the receiver device 102 of FIG. 1, and the receiver device 400 is described with reference to FIG. 1 for ease of explanation. In other embodiments, the receiver device 400 is utilized with communication systems different from the communication system 100 of FIG. 1. Similarly, the receiver device 102 of the communication system 100 of FIG. 1 is different from the receiver device 400, in some embodiments. In an embodiment, the receiver device 400 is similar to the receiver device 200 of FIG. 2 and includes like-numbered elements with the receiver device 200 of FIG. 2 which are not described in detail for brevity.

The receiver device 400 includes a sampler device 412 that is similar to the sampler device 212 of the receiver device 200 of FIG. 2, except that the sampler device 412 includes an additional sampling branch 413 not included in the sampler device 212 of the receiver device 200 of FIG. 2. The additional sampling branch 413 is outside of the data path in the receiver device 400 and is used to collect sample data for controlling adaptation constraints without perturbing the data path in the receiver device 400.

The additional sampling branch 413 is generally configured to mimic a sampling branch 213 (e.g., the sampling branch 213-1) of the sampler device 400, in an embodiment. The additional sampling branch 413 is thus clocked with a clock signal generally matching a clock signal that drives the sampling branch 214 that is mimicked by the additional sampling branch 413, in an embodiment. The receiver device 400 also includes an adaptation constraint controller 430, in an embodiment. The adaptation constraint controller 430 is configured to skew the sampling clock that drives the additional sampling branch 413 and to collect i) samples $x_{0,p}^k$ of the input signal r(t) sampled at a sampling phase shifted to the right relative to the current sampling phase, with the sampling clock that drives the additional sampling branch 413 skewed by a predetermine amount Δt with respect to the sampling clock that drives the sampling branch (e.g., the sampling branch 213-1) mimicked by the additional sampling branch 413 and ii) samples $x_{0,m}^{k}$ of the input signal r(t) sampled at a sampling phase shifted to the left relative to the current sampling phase, with the sampling clock of the additional sampling branch 413 skewed by a predetermine amount −Δt with respect to the sampling clock that drives the sampling branch (e.g., the sampling branch 213-1) mimicked by the additional sampling branch 413. In an embodiment, the adaptation constraint controller 430 is also configured to collect, from the additional sampling branch 413, samples $x_0^k$ of the input signal r(t) with the input signal r(t) sampled at the same sampling phase as the sampling phase of the sampling branch (e.g., the sampling branch 213-1) mimicked by the additional sampling branch 413, with the clock that drives the additional sampling branch 413 not skewed with respect to the sampling clock that drives the sampling branch (e.g., the sampling branch 213-1) mimicked by the additional sampling branch 413. In another embodiment, the adaptation constraint controller 430 is configured to obtain the non-shifted samples $x_0^k$ of the input signal r(t) directly from the sampling branch (e.g., the sampling branch 213-1) mimicked by the additional sampling branch 413.

The adaptation constraint controller 430 is also configured to receive decisions $d_0^k$ generated by the slicer branch 217-1 of the receiver branch (e.g., the receiver branch 211-1) that includes the sampling branch (e.g., the sampling branch 213-1) mimicked by the additional sampling branch 413, and to determine phase gradient information based on the decisions $d_0^k$ and the samples $x_0^k$, $x_{0,p}^k$, $x_{0,m}^k$. For example, the adaptation constraint controller 430 is configured to determine a slope of the channel response estimate by calculating $$\text{slope} = \begin{cases} 0, & E[x_0^k * d_0^k] \text{ is max} \\ 1, & E[x_{0,m}^k * d_0^k] \text{ is max} \\ -1, & E[x_{0,p}^k * d_0^k] \text{ is max} \end{cases} \quad \text{Equation 1}$$

where $E[x_0^k * d_0^k]$ is the expected value of the samples $x_0^k$ convolved with the decisions $d_0^k$. $E[x_{0,m}^k * d_0^k]$ is the expected value of the samples $x_{0,m}^k$ convolved with the decisions $d_0^k$, and $E[x_{op}^k * d_0^k]$ is the expected value of the samples $x_{0,p}^k$ convolved with the decisions $d_0^k$. In an embodiment, a slope of zero indicates that the input signal r(t) is sampled at or near an optimal sampling phase, a slope of 1 indicates that the optimal sampling phase is to the left of the current sampling phase and a slope of −1 indicates that the optimal sampling phase is to the right of the current sampling phase.

The adaptation constraint controller 430 is configured to adjust one or more constrained degrees of freedom for adaptation of the equalizers in the equalizer branches 215 according to the slope calculated based on the decisions $d_0^k$ and the samples $x_0^k$, $x_{0,p}^k$, $x_{0,m}^k$, in an embodiment. For example, the adaptation constraint controller 430 is configured to adjust a value of a constrained tap coefficient of each equalizer in each equalizer branch 215 based on the current value of the constrained tap coefficient according to $$C_{-1}^k = C_{-1}^{k-1} - \mu * \text{slope} \quad \text{Equation 2}$$

where $C_{-1}^k$ is the current value of the constrained tap coefficient and μ is a suitable adaptation step, in an embodiment.

In another embodiment, in addition to, or instead of, calculating and using the slope of the channel response for adjusting one or more constrained degrees of freedom for adaptation of the equalizers in the equalizer branches 215, the adaptation constraint controller 430 is configured to adjust the one or more constrained degrees of freedom for adaptation of the equalizers in the equalizer branches 215 based on a suitable function of the decisions $d_0^k$ and one or more of the samples $x_0^k$, $x_{0,p}^k$, $x_{0,m}^k$, other than the slope function. For example, in an embodiment, the adaptation constraint controller 430 is configured to adjust a value of a constrained tap coefficient of each particular equalizer 215 based on the current value of the constrained coefficient according to $$C_{-1}^k = C_{-1}^{k-1} - \mu * f(x_0^k, x_{0,p}^k, x_{0,m}^k) \quad \text{Equation 3}$$

Where $f(\cdot)$ is a custom function. The custom function $f(\cdot)$ is an empirically determined function customized for a particular communication channel and/or particular operating conditions of the receiver device 400, in an embodiment. Generally, the custom function $f(\cdot)$ in Equation 3 provides better performance of the receiver device 400 with certain types of communication channels, such as asymmetrical communication channels, in at least some embodiments. Adjusting the values of the one or more constrained coefficients of equalizers in each equalizer branch 215 based on the slope or other suitable function of the decisions $d_0^k$ and one or more of the samples $x_0^k$, $x_{0,p}^k$, $x_{0,m}^k$ causes the timing recovery controller 220 to adjust the sampling clock 219 accordingly to move the sampling phase towards the optimal sampling phase for the input signal r(t), in an embodiment.

In some embodiments, prior to collecting samples from the additional sampling branch 413 for the purpose of adjustment of the one or more constrained degrees of freedom of adaptation of the equalizers in the equalizer branches 215, the adaptation constraint controller 430 calibrates a gain and phase of the additional sampling branch 413 to match the gain and phase of the sampling branch 213 (e.g., the sampling branch 213-1) that is mimicked by the additional sampling branch 413. For example, the adaptation constraint controller 430 is configured to perform gain calibration to force expected value of $|x_0^k|$ and the expected value of $|x_{0,s}^k|$ according to $$E[|x_0^k|] = E[|x_{0,s}^k|] \quad \text{Equation 4}$$

where $x_{0,s}^k$ are samples obtained from the additional sampling branch 413 with the clock that drives the additional sampling branch 413 being the same as the clock that drives the sampling branch 213 (e.g., the sampling branch 213-1) that is mimicked by the additional sampling branch 413, without any skew intentionally introduced into the clock that drives the additional sampling branch 413. In an embodiment, the adaptation constraint controller 430 is configured to iteratively adjust the current gain $g_s^{k-1}$ of the additional sampling branch 413 by calculating a new gain $g_s^k$ for the additional sampling branch 413, for each sample k, according to $$g_s^k = g_s^{k-1} - \mu * (|x_0^k| - |x_{0,s}^k|) \quad \text{Equation 5}$$

until Equation 4 is satisfied.

In an embodiment, the adaptation constraint controller 430 is configured to perform phase calibration to force expected value of $x_0^k * d_0^{k+1} - x_0^k * d_0^{k-1}$ to be equal to the expected value of $x_0^k * d_0^{k+1} - x_0^k * d_0^{k-1}$ according to $$E[x_0^k * d_0^{k+1} - x_0^k * d_0^{k-1}] = E[x_{0,s}^k * d_0^{k+1} - x_{0,s}^k * d_0^{k-1}] \quad \text{Equation 6}$$

Where $d_0^{k+1}$, $d_0^{k-1}$ the decisions generated by the slicer branch (e.g., the slicer branch 217-1) corresponding to the sampling branch 213 (e.g., the sampling branch 213-1) that is mimicked by the additional sampling branch 413, one unit interval ahead and lagging of the decision $d_0^k$, respectively. In an embodiment, the adaptation constraint controller 430 is configured to iteratively adjust the current phase of the clock signal that drives the additional sampling branch 413 by calculating a new phase $\tau_s^k$, for each sample k, according to $$\tau_s^k = \tau_s^{k-1} - \mu * \text{sgn}([x_0^k * d_0^{k+1} - x_0^k * d_0^{k-1}] - [x_{0,s}^k * d_0^{k+1} - x_{0,s}^k * d_0^{k-1}]) \quad \text{Equation 7}$$

until Equation 6 is satisfied.

The adaptation constraint controller 430 is configured to set the gain and the phase of the additional sampling branch 413 based on the gain and the phase calculated in Equations 5 and 7, respectively. Once the gain and the phase of the additional sampling branch 413 are set based on the gain and the phase calculated in Equations 5 and 7, respectively, the adaptation constraint controller 430 is ready to begin collecting samples from the additional the additional sampling branch 413 for the purpose of adjustment of the one or more constrained degrees of freedom for adaptation of the equalizers in the equalizer branches 215, and performing the adjustment of the one or more constrained degrees of freedom for adaptation of the equalizers in the equalizer branches 215 as described above, in an embodiment.

Figure 5:
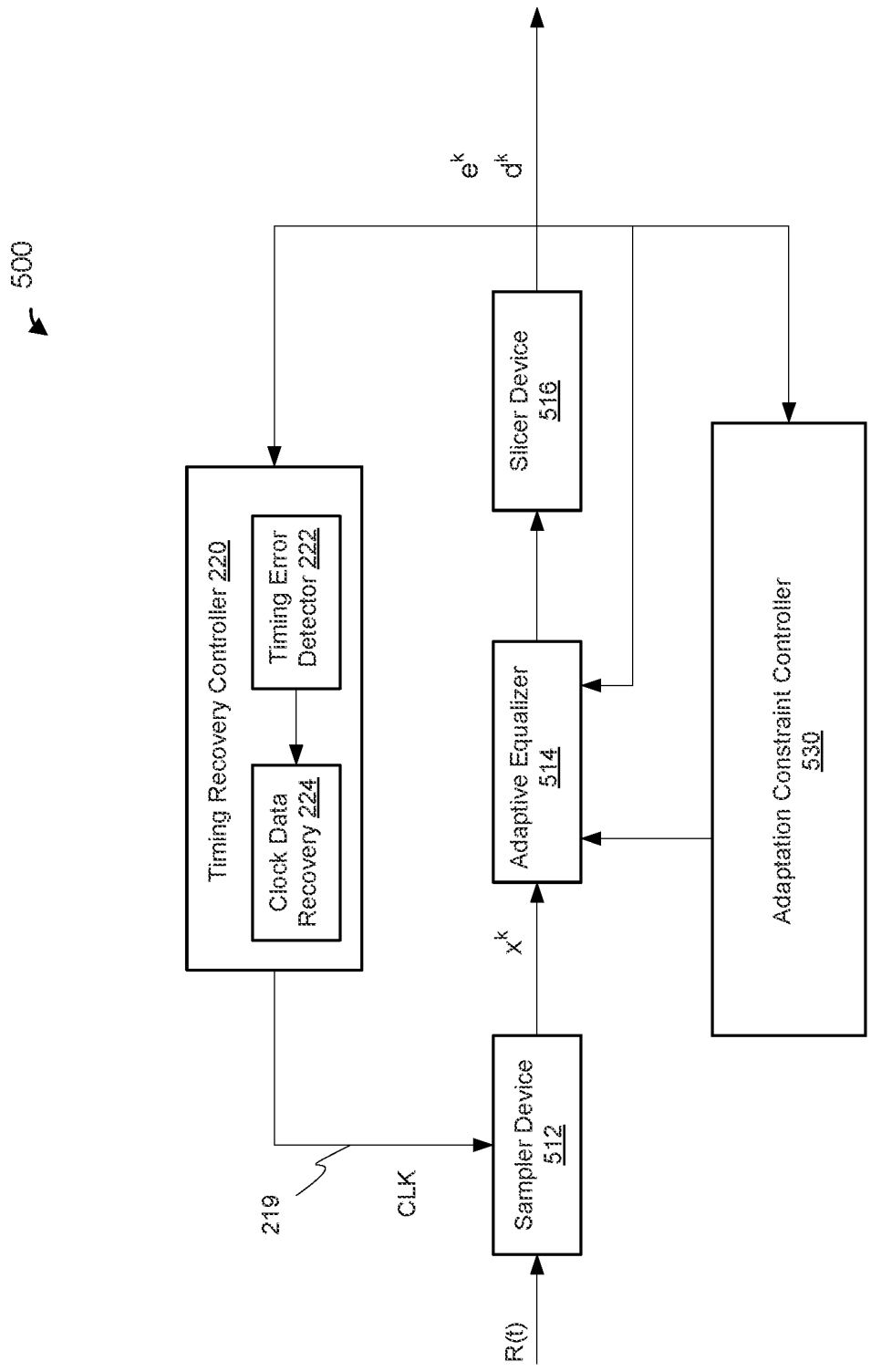
FIG. 5 is a block diagram of a receiver device configured to adjust constraints on adaptation of an equalizer based on tracking a sampling phase of an input signal, according to another embodiment.

FIG. 5 is a block diagram of a receiver device 500, according to an embodiment. In an embodiment, the receiver device 500 corresponds to the receiver device 102 of FIG. 1, and the receiver device 500 is described with reference to FIG. 1 for case of explanation. In other embodiments, the receiver device 500 is utilized with communication systems different from the communication system 100 of FIG. 1. Similarly, the receiver device 102 of the communication system 100 of FIG. 1 is different from the receiver device 500, in some embodiments. In an embodiment, the receiver device 500 is similar to the receiver device 200 of FIG. 2 and includes like-numbered elements with the receiver device 200 of FIG. 2 which are not described in detail for brevity.

The receiver device 500 includes a sampler device 512 that is the same as or similar to the sampler device 212 of the receiver device 200 of FIG. 2. Referring briefly to FIG. 4, unlike the sampler device 412 of the receiver device 400 of FIG. 4, the sampler device 500 does not include an additional sampling circuit such as the additional sampling branch 413, in an embodiment. The receiver device 500 also includes an equalizer 514 that is the same as or similar to the equalizer 214 of FIG. 2 and a slicer device 516 that is the same as or similar to the slicer device 216 of FIG. 2. Although not illustrated in FIG. 5 to simplify the figure, the sampler device 512, the equalizer 514 and the slicer device 516 include, respectively, a plurality of sampling branches, a plurality of equalizer branches and a plurality of slicer branches corresponding to a plurality of receiver branches of the receiver device 500, in some embodiments.

The receiver device 500 also includes an adaptation constraint controller 530. The adaptation constraint controller 530 is configured to determine phase gradient information from samples of the input signal r(t) using interpolation and without physically skewing a sampling clock, in an embodiment. In an embodiment, the adaptation constraint controller 530 is configured to determine, based on samples $x^k$ and corresponding channel decisions $d^k$ for different (e.g., consecutive) samples $x^k$ generated by the sampler device 512, respective channel response estimates $\underline{h}$ corresponding to the channel response at a time corresponding to the current sampling phase of each of the samples $x^k$, and to interpolate between the respective channel response estimates $\underline{h}$ to obtain i) channel response estimates $\underline{h}^+$ corresponding to the channel response at a time shifted by a predetermined amount $\Delta t$ with respect to the time corresponding to current sampling phase and ii) channel response estimates $\underline{h}^-$ corresponding to the channel response at a time shifted by a predetermined amount $-\Delta t$ with respect to the current phase. The adaptation constraint controller 530 is further configured to determine the phase gradient information based on the channel response estimate $\underline{h}$ and the interpolated channel response estimates $\underline{h}^+$ and $\underline{h}^-$, in an embodiment. For example, the adaptation constraint controller 530 is configured to determine a slope of the channel response based on determining which one among i) the main tap of the channel response estimates $\underline{h}$, ii) the main tap of the channel response estimate $\underline{h}^+$ and iii) the main tap of the channel response estimate $\underline{h}^-$ has the most energy, according to:

$$\text{slope} = \begin{cases} 0, & \underline{h}(\text{main}) \text{ is max} \\ 1, & \underline{h}^-(\text{main}) \text{ is max} \\ -1, & \underline{h}^+(\text{main}) \text{ is max} \end{cases} \quad \text{Equation 8}$$

In an embodiment, a slope of zero indicates that the input signal r(t) is sampled at or near an optimal sampling phase, a slope of 1 indicates that the optimal sampling phase is to the left of the current sampling phase and a slope of $-1$ indicates that the optimal sampling phase is to the right of the current sampling phase.

In another embodiment, the adaptation constraint controller 530 is configured to determine the phase gradient information based on analyzing the channel response estimate $\underline{h}$, without explicitly interpolating to obtain estimates $\underline{h}^+$ and $\underline{h}^-$. For example, the adaptation constraint controller 530 a slope of the channel response by applying the difference (diff) function to the channel response estimate $\underline{h}$ according to:

$$\text{Slope} = \text{diff}(\underline{h}) \quad \text{Equation 9}$$

In an embodiment, the adaptation constraint controller 530 is configured to adjust one or more constrained degrees of freedom for adaptation of the equalizers in the equalizer branches 215 according to the slope calculated based on Equation 8 or Equation 9, for example. In an embodiment, the adaptation constraint controller 530 is configured to adjust a value of a constrained tap coefficient of the equalizer 514 (e.g., in each of a plurality of equalizer branches included in the equalizer 514) based on the current value of the constrained coefficient according to $$C_{-1}^k = C_{-1}^{k-1} - \mu * \text{slope} \quad \text{Equation 10}$$

where $C_{-1}^k$ is the current value of the constrained coefficient and u is a suitable adaptation step, in an embodiment.

In another embodiment, in addition to or instead of calculating and using the slope of the channel response for adjusting one or more constrained degrees of freedom for adaptation of the equalizer 514, the adaptation constraint controller 530 is configured to adjust the one or more constrained degrees of freedom for adaptation of the equalizer 515 based on a suitable function of the channel response estimate $\underline{h}$ and the interpolated channel response estimates $\underline{h}^+$ and $\underline{h}^-$ other than the slope function. For example, in an embodiment, the adaptation constraint controller 530 is configured to adjust a value of a constrained tap coefficient in each equalizer branch included in the equalizer 514 based on the current value of the constrained tap coefficient according to $$C_{-1}{}^{k}=C_{-1}{}^{k-1}-\mu*f(\underline{h}^{+}(\text{main}),\underline{h}^{-}(\text{main}))\quad\text{Equation 10}$$

where $f(\cdot)$ is a custom function. The custom function $f(\cdot)$ is an empirically determined function customized for a particular communication channel and/or particular operating conditions of the receiver device 500, in an embodiment. Generally, the custom function $f(\cdot)$ in Equation 3 provides better performance of the receiver device 500 with certain types of communication channels, such as asymmetrical communication channels. Adjusting the values of the one or more constrained coefficients of equalizers in each equalizer branch of the equalizer 514 based on the slope or other suitable function of the channel response estimate $\underline{h}$ and the interpolated channel response estimates $\underline{h}^{+}$ and $\underline{h}^{-}$ causes the timing recovery controller 220 to adjust the sampling clock 219 accordingly to move the sampling phase towards the optimal sampling phase for the input signal r(t), in an embodiment FIG. 6 is a block diagram of an example receiver device 600, according to an embodiment. In an embodiment, the receiver device 600 corresponds to the receiver device 102 of FIG. 1, and the receiver device 600 is described with reference to FIG. 1 for case of explanation. In other embodiments, the receiver device 600 is utilized with communication systems different from the communication system 100 of FIG. 1. Similarly, the receiver device 102 of the communication system 100 of FIG. 1 is different from the receiver device 600, in some embodiments. In an embodiment, the receiver device 600 is similar to the receiver device 200 of FIG. 2 and includes like-numbered elements with the receiver device 200 of FIG. 2 which are not described in detail for brevity.

The receiver device 600 includes a sampler device 612 that is the same as or similar to the sampler device 212 of the receiver device 200 of FIG. 2. Referring briefly to FIG. 4, unlike the sampler device 412 of the receiver device 400 of FIG. 4, the sampler device 612 does not include an additional sampling circuit such as the additional sampling branch 413, in an embodiment. The receiver device 600 also includes an equalizer 614 that is the same as or similar to the equalizer 214 of FIG. 2 and a slicer device 616 that is the same as or similar to the slicer device 216 of FIG. 2. Although not illustrated in FIG. 6 to simplify the figure, the sampler device 612, the adaptive equalizer 614 and the slicer device 616 include, respectively, a plurality of sampling branches, a plurality of equalizer branches and a plurality of slicer branches corresponding to a plurality of receiver branches of the receiver device 600, in some embodiments.

The receiver device 600 also includes an adaptation constraint controller 630. The adaptation constraint controller 630 is configured to determine phase gradient information based on samples of the input signal r(t) using interpolation and without physically skewing a sampling clock, in an embodiment. In an embodiment, the adaptation constraint controller 630 is configured to determine, based on samples $x^{k}$ and corresponding channel decisions $d^{k}$ for different (e.g., consecutive) samples $x^{k}$ generated by the sampler device 612, respective channel response estimates $\underline{h}$ corresponding to the channel response at a time corresponding to the current sampling phase of each of the samples $x^{k}$, and to interpolate between the respective channel response estimates $\underline{h}$ to obtain channel response estimates i) $\underline{h}^{+}$ corresponding to the channel response at a time shifted by a predetermined amount $\Delta t$ with respect to the time corresponding to the current sampling phase and ii) $\underline{h}^{-}$ corresponding to the channel response at a time shifted by a predetermined amount $-\Delta t$ with respect to the time corresponding to the current sampling phase.

The adaptation constraint controller 630 is configured to, based on the phase gradient information determined based on the samples of the input signal r(t), control operation of timing recovery in the receiver device 600 to use, as a reference for the timing recovery, either the samples $x^{k}$ of the input signal r(t) or the channel response estimates $\underline{h}$ determined based on the samples $x^{k}$ of the input signal r(t), in an embodiment. In an embodiment, the receiver device 600 includes a first timing error detector 222a and a second timing error detector 222b. The timing first error detector 222a is configured to use the channel response estimate $\underline{h}$ as a reference signal, and to detect the timing error based on the channel response estimate $\underline{h}$ as the reference signal. The second timing error detector 222b is configured to use the decisions and the errors generated by the slicer device 616 based on equalized samples of the input signal r(t) as a reference signal, and to determine the timing error based on the decisions and the errors generated by the slicer device 616 based on equalized samples of the input signal r(t) as the reference signal. The outputs of the first timing error detector 222a and the second timing error detector 222b are coupled to the clock data recovery circuitry 224 via a multiplexer (MUX) 632, in an embodiment. The adaptation constraint controller 630 is configured to control the receiver device 600 to use the channel response estimates $\underline{h}$ or the decisions and errors generated by the slicer device 616 based on equalized samples of the input signal r(t) as a reference for timing recovery by controlling the MUX 632 to couple the output of the first timing error detector 222a or the output of the second timing error detector 222b to the clock data recovery circuitry 224, in an embodiment.

In an embodiment, the adaptation constraint controller 630 is configured to control the receiver device 600 to use the channel response estimates $\underline{h}$ as a reference for timing recovery when the adaptation constraint controller 630 determines, based on the channel response estimates $\underline{h}$ and the interpolated channel response estimates $\underline{h}^{+}$ and $\underline{h}^{-}$, that the input signal r(t) is not sampled at an optimal sampling point for the input signal r(t). For example, the adaptation constraint controller 630 is configured to determine a slope of the channel response based on the channel response estimates $\underline{h}$ and the interpolated channel response estimates $\underline{h}^{+}$ and $\underline{h}^{-}$, as described above in connection with Equation 7 or Equation 8, and determine that the input signal r(t) is not sampled at an optimal sampling point for the input signal r(t) if the slope is not, or is not sufficiently clos to, zero (e.g., if the energy of $\underline{h}^{-}$ (main) or the energy of $\underline{h}^{-}$ (main) exceeds the energy of $\bar{h}$(main) by a threshold amount). Switching the timing receiver device 600 to use the channel response estimates $\underline{h}$ as a reference for timing recovery causes the CDR circuit 224 of the receiver device 600 to move the sampling phase towards the optimal sampling phase for the input signal r(t), in an embodiment. In an embodiment, when the adaptation constraint controller 630 determines, based on the channel response estimates $\underline{h}$ and the interpolated channel response estimates $\underline{h}^{+}$ and $\underline{h}^{-}$, that the input signal r(t) is not sampled at an optimal sampling point for the input signal r(t), the adaptation constraint controller 630 also un-constrains (e.g., via a multiplexer 634) adaptation of the adaptive equalizer 614 to allow the equalizer to freely adapt to the communication channel, in an embodiment. Because the timing recovery is performed based on the channel response estimates h while the equalizer 614 is freely adapting to the communication channel, the timing recovery is decoupled from the free adaptation by the equalizer 614, in an embodiment. The adaptation constraint controller 630 is configured to continue determining the phase gradient information based on the input signal r(t) as the sampling phase is being shifted by the CDR circuit 224 towards the optimal sampling phase, in an embodiment. Once the adaptation constraint controller 630 determines, based on newly obtained channel response estimates h and newly interpolated channel response estimates $\underline{h}^+$ and $\underline{h}^-$ as the, as the sampling phase is being shifted by the CDR circuit 224 towards the optimal sampling phase, that the input signal r(t) is sampled at or sufficiently close to the optimal sampling phase, the adaptation constraint controller 630 re-constrains adaptation of the equalizer 614 and switches timing recovery of the receiver device 600 based on the decisions and the errors generated by the slicer device 616 based on equalized samples of the input signal r(t) as the reference signal. In an embodiment, re-constraining adaptation of the equalizer 614 includes setting values one or more previously constrained tap coefficients in the equalizer 614 to their current coefficient values. Operation of the receiver device 600 then remains in the constrained adaptation mode until the controller 630 again determines, based on channel response estimates h and \ interpolated channel response estimates $\underline{h}^+$ and $\underline{h}^-$, that the input signal r(t) is sampled at a non-optimal sampling phase, in an embodiment.

Figure 7:
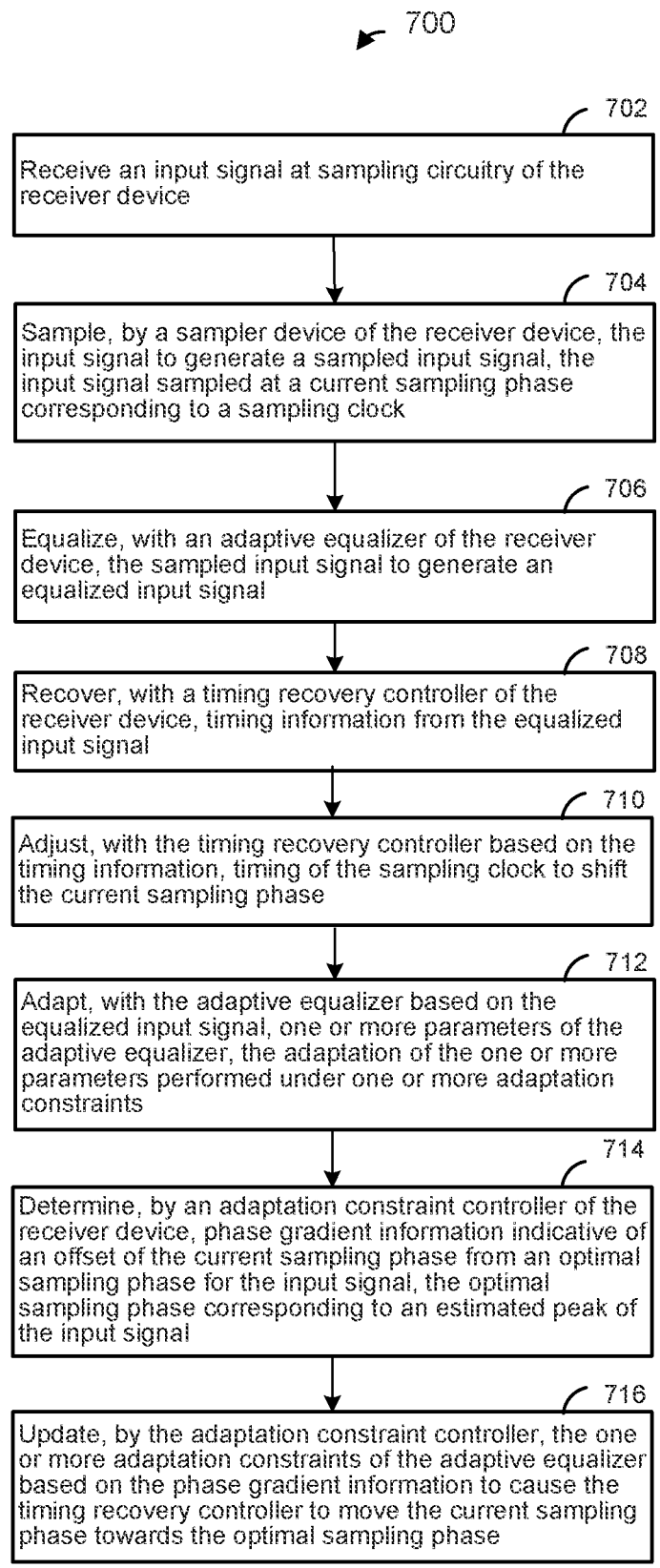
FIG. 7 is a flow diagram illustrating an example method for tracking a sampling phase in a receiver device, according to an embodiment.

FIG. 7 is a flow diagram illustrating an example method 700 for tracking a sampling phase in a receiver device, according to an embodiment. In an embodiment, the method 700 is implemented by the adaptive constraint controller 130 of the receiver device 102 of FIG. 1. The method 700 is implemented by one of the adaptive constraint controllers 230, 430, 530 and 630 or the receiver devices 200, 400, 500, 600 of FIGS. 2, 4, 5, 6, respectively, in other embodiments. For ease of explanation, the method 700 is generally described with reference to the receiver device 102 of FIG. 1.

At block 702, an input signal is received at a sampler device of the receiver device and, at block 704, the input signal is sampled by the sampler device to generate a sampled input signal. In an embodiment, the sampler device 112 of FIG. 1 samples the input signal at block 702. In another embodiment, a suitable sampler device different from the sampler device 112 of FIG. 1 samples the input signal at block 704. In an embodiment, the input signal is sampled at block 704 at a current sampling phase corresponding to a sampling clock of the receiver device.

At block 706, the sampled input signal is equalized with an adaptive equalizer of the receiver device to generate an equalized input signal. In an embodiment, the sampled input signal is equalized by the adaptive equalizer 114 of FIG. 1. In another embodiment, the sampled input signal is equalized by a suitable adaptive equalizer different from the adaptive equalizer 114 of FIG. 1. At block 708, timing information is recovered from the equalized input signal. In an embodiment, the timing information is recovered by a timing recovery controller of the receiver device. In an embodiment, the timing information is recovered by the timing recovery controller 120 of FIG. 1. In another embodiment, the timing information is recovered by a suitable timing recovery controller different from the timing recovery controller 120 of FIG. 1 At block 710, timing of the sampling clock is adjusted based on the timing information recovered from the equalized input signal at block 708. In an embodiment, the timing recovery controller of the receiver device adjusts the timing of the sampling clock based on the timing information recovered from the equalized input signal.

At block 712, one or more parameters (e.g., one or more degrees of freedom) of the adaptive equalizer are adapted based on the equalized input signal. For example, one or more tap coefficients of the adaptive equalizer are adapted at block 712. In an embodiment, the adaptation of the one or more parameters at block 712 is performed under one or more adaptation constraints. For example, one or more tap coefficients of the adaptive equalizer are pinned to values determined, for example, at a start-up of the receiver device and are not allowed to freely adapt during operation of the receiver device, in an embodiment. In other embodiments, the adaptation of the one or more parameters at block 712 is performed under other suitable adaptation constraints.

At block 714 phase gradient information is determined by an adaptation constraint controller of the receiver device. In an embodiment, the phase gradient information determined at block 714 is indicative of an offset of the current sampling phase from an optimal sampling phase for the input signal, where the optimal sampling phase corresponding to an estimated peak of the input signal. In an embodiment, for example as described in connection with FIGS. 2 and 3, the phase gradient information is determined by measuring performance of the receiver device with the input signal sampled at the current sampling phase and at one or more sampling phases skewed with respect to the current sampling phase, and determining whether performance of the receiver device 102 improves, or gets worse, when the input signal is sampled at the one or more sampling phases skewed with respect to the current sampling phase. In another embodiment, for example as described above in connection with FIGS. 4-6, the phase gradient information is determined based on a measured or interpolated channel response estimate corresponding to the input signal sampled at the current sampling phase and one or more skewed channel response estimates corresponding to the input signal sampled at one or more sampling phases skewed relative to the current sampling phase. For example, the phase gradient information is determined based on whether energy in the main tap of a skewed channel response corresponding to the input signal sampled at a sampling phase skewed with respect to the current sampling phase is greater, by a threshold amount, than the energy in the main tap of the current channel response corresponding to the current sampling phase, in an embodiment. In other embodiments, the phase gradient information is determined in other suitable manners.

At block 716, the one or more adaptation constraints of the adaptive equalizer are updated by the adaptation constraint controller based on the phase gradient information determined at block 714. For example, values of one or more coefficients that are pinned and are not allowed to freely adapt during operation of the receiver device are updated by adjusting current values of the one or more coefficients based on the phase gradient information, and/or by temporarily allowing the one or more tap coefficients to freely adapt and then re-constraining the one or more tap coefficients, as described above, in various embodiments. In an embodiment, updating the one or more adaptation constraints at block 716 causes the timing recovery controller to move the current sampling phase towards the optimal sampling phase for the input signal. Thus, updating the one or more adaptation constraints based on the phase gradient information allows the receiver device to adequately adapt to changing operating conditions of the receiver device, while still constraining adaptation of the adaptive equalizer of the receiver device and preventing undesired interaction between the sampling phase correction by the timing recovery controller of the receiver device and adaptation by the adaptive equalizer of the receiver device that would degrade performance of the receiver device under some operating conditions, such as changes in temperature, in at least some embodiments.

Embodiment 1: A method for tracking a sampling phase in a receiver device, the method comprising: receiving an input signal at a sampler device of the receiver device; sampling, by the sampler device, the input signal to generate a sampled input signal, the input signal sampled at a current sampling phase corresponding to a sampling clock; equalizing, with an adaptive equalizer of the receiver device, the sampled input signal to generate an equalized input signal; adapting, with the adaptive equalizer based on the equalized input signal, one or more parameters of the adaptive equalizer, the adaptation of the one or more parameters being performed under one or more adaptation constraints; determining, by an adaptation constraint controller of the receiver device, phase gradient information indicative of an offset of the current sampling phase from an optimal sampling phase for the input signal, the optimal sampling phase corresponding to an estimated peak of the input signal; and updating, by the adaptation constraint controller, the one or more adaptation constraints of the adaptive equalizer based on the phase gradient information to move the current sampling phase towards the optimal sampling phase.

Embodiment 2: The method of claim 1, further comprising: recovering, with a timing recovery controller of the receiver device, timing information from the equalized input signal, and adjusting, with the timing recovery controller based on the timing information recovered from the equalized input signal, timing of the sampling clock to adjust the current sampling phase, wherein updating the one or more adaptation constraints causes the timing recovery circuitry to move the current sampling phase towards the optimal sampling phase.

Embodiment 3: The method of embodiment 1 or embodiment 2, wherein determining the phase gradient information includes: determining a current channel response estimate corresponding to the input signal sampled at the current sampling phase, determining one or more skewed channel response estimates corresponding to the input signal sampled at one or more sampling phases that are skewed relative to the current sampling phase, and determining the phase gradient information as a function of the current channel response estimates and the one or more skewed second channel response estimates.

Embodiment 4: The method of embodiment 3, wherein: determining the current channel response estimate comprises i) obtaining first samples of the input signal at the current sampling phase and ii) convolving the first samples of the input signal with corresponding transmitted symbol decisions made by the receiver device, and determining one or more skewed channel response estimates comprises i) obtaining second samples of the input signals at the one or more sampling phases skewed relative to the current sampling phase and ii) convolving the second samples of the input signal with the corresponding transmitted symbol decisions made by the receiver device.

Embodiment 5: The method of embodiment 4, wherein: obtaining the first samples of the input signal comprises sampling the input signal in a first receiver branch using a first sampling clock corresponding to the current sampling phase, the first receiver branch being in a data path of the receiver device, and obtaining the second samples of the input signal comprises sampling the input signal in an additional receiver branch using a second sampling clock that is skewed with respect to the first sampling clock, the additional receiver branch being outside of the data path of the receiver device.

Embodiment 6: The method of embodiment 4, wherein: obtaining the first samples of the input signal comprises sampling the input signal at the current sampling phase, and obtaining the second samples of the input signal comprises interpolating between first samples obtained at the current sampling phase to estimate the second samples at the one or more sampling phases skewed with respect to the current sampling phase.

Embodiment 7: The method of any of the embodiments 2-6, wherein determining the phase gradient information as a function of the current channel response estimate and the one or more skewed channel response estimates comprises determining a direction of a slope of the channel response at the current sampling phase based on identifying a maximum one among i) a main tap of the current channel response estimate corresponding to the current sampling phase, ii) a main tap of a first skewed channel response estimate corresponding to a sampling phase skewed in a first direction relative to the current sampling phase, and iii) a main tap of a second skewed channel response estimate corresponding a sampling phase skewed in a second direction relative to the current sampling phase, and updating the one or more adaptation constraints of the adaptive equalizer comprises adjusting values of constrained coefficient of one or more taps of the adaptive equalizer by an adaptation step in a direction opposite of the slope of the channel response.

Embodiment 8: The method of any of the embodiments 2-6, wherein updating the one or more adaptation constraints includes: determining, based on i) the current channel response estimate, ii) a first skewed channel response estimate and iii) a second skewed channel response estimate, whether i) the adaptive equalizer is to be adapted in an unconstrained mode while allowing the clock recovery circuitry to align a phase of the clock signal with a phase of the channel response or ii) the adaptive equalizer is to be adapted in a constrained mode while allowing recovery of the clock signal from the input signal, and in response to determining that the adaptive equalizer is to be adapted in an unconstrained mode while allowing the clock recovery circuitry to align a phase of the clock signal with a phase of the channel response, switching operation of the adaptive equalizer to the unconstrained mode to allow the adaptive equalizer to freely adapt, and switching input to the clock recovery circuitry to the estimate of the channel response to allow the clock recovery circuitry to align the phase of the clock signal with the phase of the channel response.

Embodiment 9: The method of embodiment 1, wherein the receiver device includes a plurality of time-interleaved receiver branches, and determining the phase gradient information comprises: successively disabling contribution of respective receiver branches to the timing recovery while allowing unconstrained equalization by respective adaptive equalizers in the corresponding receiver branches, when contribution of a particular receiver branch to timing information recovery is disabled, i) determining a first performance metric of the receiver branch with the input signal sampled at the current sampling phase, ii) skewing the sampling clock in a first direction to determine a second performance metric of the receiver branch with the input signal sampled at a sampling phase skewed in the first direction from the current sampling phase, and iii) determining a third performance metric of the receiver branch with the input signal sampled at a sampling phase skewed in a second direction from the current sampling phase, and determining the phase gradient information based on whether the second receiver performance metric or the third receiver performance metric indicates better performance of the receiver device than the first receiver performance metric, on average, for the time-interleaved receiver branches.

Embodiment 10: The method of embodiment 9, wherein: determining the phase gradient information further comprises determining a direction in which previously constrained coefficients in the respective adaptive equalizers in time-interleaved receiver branches moved, on average, when allowed to freely adapt to provide the performance of the receiver device, and updating the one or more adaptation constraints of the adaptive equalizer comprises adjusting values of constrained coefficient of one or more taps of the adaptive equalizer by an adaptation step in the determined direction.

Embodiment 11: A receiver device, comprising: front end circuitry configured to receive an input signal; a sampler device configured to sample the input signal the input signal to generate a sampled input signal, the sampling being performed at a current sampling phase; an adaptive equalizer configured to: equalize the sampled input signal to generate an equalized input signal, and adapt, based at least in part on the equalized input signal, one or more parameters of the adaptive equalizer, the adaptation of the one or more parameters being performed under one or more adaptation constraints; and an adaptation constraint controller configured to: determine phase gradient information indicative of an offset of the current sampling phase from an optimal sampling phase for the receiver device, the optimal sampling phase corresponding to an estimated peak of the input signal, and update the one or more adaptation constraints of the adaptive equalizer based on the phase gradient information to move the current sampling phase of the receiver device towards the optimal sampling phase.

Embodiment 12: The receiver device of embodiment 11, further comprising a timing recovery controller configured to: recover timing information from the equalizer output signal, and adjust, based on the timing information recovered from the equalized input signal, timing of the sampling clock to adjust the current sampling phase, wherein updating the one or more adaptation constraints causes the timing recovery circuitry to move the current sampling phase towards the optimal sampling phase.

Embodiment 13: The receiver device of embodiment 11 or embodiment 12, wherein the adaptation constraint controller is configured to: determine a current channel response estimate corresponding to the input signal sampled at the current sampling phase, determine one or more skewed channel response estimates corresponding to the input signal sampled at one or more sampling phases that are skewed relative to the current sampling phase, and determine the phase gradient information as a function of the current channel response estimates and the one or more skewed second channel response estimates.

Embodiment 14: The receiver device of claim 13, wherein the adaptation constraint controller is configured to: determine the current channel response estimate at least by i) obtaining first samples of the input signal at the current sampling phase and ii) convolving the first samples of the input signal with corresponding transmitted symbol decisions made by the receiver device, and determine one or more skewed channel response estimates at least by i) obtaining second samples of the input signals at the one or more sampling phases skewed relative to the current sampling phase and ii) convolving the second samples of the input signal with the corresponding transmitted symbol decisions made by the receiver device.

Embodiment 14: 15 receiver device of embodiment 14, wherein: the sampler device comprises at least a first sampling branch in a data path of the receiver device, the at least the first sampling branch configured to sample the input signal at the current sampling phase, and an additional sampling branch outside the data path of the receiver device, wherein the adaptation constraint controller is configured to obtain the second samples of the input signal by skewing a sampling clock of the additional sampling branch.

Embodiment 16: The receiver device of embodiment 15, wherein the adaptation constraint controller is configured to obtain the second samples of the input signal at least by interpolating between first samples obtained at the current sampling phase to estimate the second samples at the one or more sampling phases skewed with respect to the current sampling phase.

Embodiment 17: The receiver device of any of the embodiments claim 12-16, wherein the adaptation constraint controller is configured to determine the phase gradient information as a function of the current channel response estimate and the one or more skewed channel response estimates at least by determining a direction of a slope of the channel response at the current sampling phase based on identifying a maximum one among i) a main tap of the current channel response estimate corresponding to the current sampling phase i) a main tap of a first skewed channel response estimate corresponding to a sampling phase skewed in a first direction relative to the current sampling phase and iii) a main tap of a second skewed channel response estimate corresponding a sampling phase skewed in a second direction relative to the current sampling phase, and update the one or more adaptation constraints of the adaptive equalizer at least by adjusting values of constrained coefficient of one or more taps of the adaptive equalizer by an adaptation step in a direction opposite of the slope of the channel response.

Embodiment 18: The receiver device of any of the embodiments 12-16, wherein the adaptation constraint controller is configured to: determine, based on i) the current channel response estimate, ii) a first skewed channel response estimate and iii) a second skewed channel response estimate, whether i) the adaptive equalizer is to be adapted in an unconstrained mode while allowing the clock recovery circuitry to align a phase of the clock signal with a phase of the channel response or ii) the adaptive equalizer is to be adapted in a constrained mode while allowing recovery of the clock signal from the input signal, and in response to determining that the adaptive equalizer is to be adapted in an unconstrained mode while allowing the clock recovery circuitry to align a phase of the clock signal with a phase of the channel response, switch operation of the adaptive equalizer to the unconstrained mode to allow the adaptive equalizer to freely adapt, and switch input to the clock recovery circuitry to the estimate of the channel response to allow the clock recovery circuitry to align the phase of the clock signal with the phase of the channel response.

Embodiment 19: The receiver device of embodiment 11, wherein the receiver device includes a plurality of time-interleaved receiver branches, and the adaptation constraint controller is configured to: successively disable contribution of respective receiver branches to the timing recovery while allowing unconstrained equalization by respective adaptive equalizers in the corresponding receiver branches, with contribution of a particular receiver branch to timing information recovery being disabled, i) determine a first performance metric of the receiver branch with the input signal sampled at the current sampling phase, ii) skew the sampling clock in a first direction to determine a second performance metric of the receiver branch with the input signal sampled at a sampling phase skewed in the first direction from the current sampling phase, and iii) determine a third performance metric of the receiver branch with the input signal sampled at a sampling phase skewed in a second direction from the current sampling phase, and determine the phase gradient information based on whether the second receiver performance metric or the third receiver performance metric indicates better performance of the receiver device than the first receiver performance metric, on average, for the time-interleaved receiver branches.

Embodiment 20: The receiver device of embodiment 19, wherein the adaptation constraint controller is configured to: determine a direction in which previously constrained coefficients in the respective adaptive equalizers in time-interleaved receiver branches moved, on average, when allowed to freely adapt to provide the performance of the receiver device, and update the one or more adaptation constraints of the adaptive equalizer at least by adjusting values of constrained coefficient of one or more taps of the adaptive equalizer by an adaptation step in the determined direction.

At least some of the various blocks, operations, and techniques described above are suitably implemented utilizing dedicated hardware, such as one or more of discrete components, an integrated circuit, an application-specific integrated circuit (ASIC), a programmable logic device (PLD), a processor executing firmware instructions, a processor executing software instructions, or any combination thereof. When implemented utilizing a processor executing software or firmware instructions, the software or firmware instructions may be stored in any suitable computer readable memory such as on a magnetic disk, an optical disk, or other storage medium, etc. The software or firmware instructions may include machine readable instructions that, when executed by one or more processors, cause the one or more processors to perform various acts.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for tracking a sampling phase in a receiver device, the method comprising:
   receiving an input signal at a sampler device of the receiver device;
   sampling, by the sampler device, the input signal to generate a sampled input signal, the input signal sampled at a current sampling phase corresponding to a sampling clock;
   equalizing, with an adaptive equalizer of the receiver device, the sampled input signal to generate an equalized input signal;
   adapting, with the adaptive equalizer based on the equalized input signal, one or more parameters of the adaptive equalizer, the adaptation of the one or more parameters being performed under one or more adaptation constraints;
   determining, by an adaptation constraint controller of the receiver device, phase gradient information indicative of an offset of the current sampling phase from an optimal sampling phase for the input signal, the optimal sampling phase corresponding to an estimated peak of the input signal; and
   updating, by the adaptation constraint controller, the one or more adaptation constraints of the adaptive equalizer based on the phase gradient information to move the current sampling phase towards the optimal sampling phase.

2. The method of claim 1, further comprising:
   recovering, with a timing recovery controller of the receiver device, timing information from the equalized input signal, and
   adjusting, with the timing recovery controller based on the timing information recovered from the equalized input signal, timing of the sampling clock to adjust the current sampling phase, wherein updating the one or more adaptation constraints causes the timing recovery circuitry to move the current sampling phase towards the optimal sampling phase.

3. The method of claim 1, wherein determining the phase gradient information includes:
   determining a current channel response estimate corresponding to the input signal sampled at the current sampling phase,
   determining one or more skewed channel response estimates corresponding to the input signal sampled at one or more sampling phases that are skewed relative to the current sampling phase, and
   determining the phase gradient information as a function of the current channel response estimates and the one or more skewed second channel response estimates.

4. The method of claim 3, wherein:
   determining the current channel response estimate comprises i) obtaining first samples of the input signal at the current sampling phase and ii) convolving the first samples of the input signal with corresponding transmitted symbol decisions made by the receiver device, and
   determining one or more skewed channel response estimates comprises i) obtaining second samples of the input signals at the one or more sampling phases skewed relative to the current sampling phase and ii) convolving the second samples of the input signal with the corresponding transmitted symbol decisions made by the receiver device.

5. The method of claim 4, wherein:
obtaining the first samples of the input signal comprises sampling the input signal in a first receiver branch using a first sampling clock corresponding to the current sampling phase, the first receiver branch being in a data path of the receiver device, and
obtaining the second samples of the input signal comprises sampling the input signal in an additional receiver branch using a second sampling clock that is skewed with respect to the first sampling clock, the additional receiver branch being outside of the data path of the receiver device.

6. The method of claim 4, wherein:
obtaining the first samples of the input signal comprises sampling the input signal at the current sampling phase, and
obtaining the second samples of the input signal comprises interpolating between first samples obtained at the current sampling phase to estimate the second samples at the one or more sampling phases skewed with respect to the current sampling phase.

7. The method of claim 3, wherein:
determining the phase gradient information as a function of the current channel response estimate and the one or more skewed channel response estimates comprises determining a direction of a slope of the channel response at the current sampling phase based on identifying a maximum one among i) a main tap of the current channel response estimate corresponding to the current sampling phase ii) a main tap of a first skewed channel response estimate corresponding to a sampling phase skewed in a first direction relative to the current sampling phase and iii) a main tap of a second skewed channel response estimate corresponding a sampling phase skewed in a second direction relative to the current sampling phase, and
updating the one or more adaptation constraints of the adaptive equalizer comprises adjusting values of constrained coefficient of one or more taps of the adaptive equalizer by an adaptation step in a direction opposite of the slope of the channel response.

8. The method of claim 3, wherein updating the one or more adaptation constraints includes:
determining, based on i) the current channel response estimate, ii) a first skewed channel response estimate and iii) a second skewed channel response estimate, whether i) the adaptive equalizer is to be adapted in an unconstrained mode while allowing the clock recovery circuitry to align a phase of the clock signal with a phase of the channel response or ii) the adaptive equalizer is to be adapted in a constrained mode while allowing recovery of the clock signal from the input signal, and
in response to determining that the adaptive equalizer is to be adapted in an unconstrained mode while allowing the clock recovery circuitry to align a phase of the clock signal with a phase of the channel response,
switching operation of the adaptive equalizer to the unconstrained mode to allow the adaptive equalizer to freely adapt, and
switching input to the clock recovery circuitry to the estimate of the channel response to allow the clock recovery circuitry to align the phase of the clock signal with the phase of the channel response.

9. The method of claim 1, wherein:
the receiver device includes a plurality of time-interleaved receiver branches, and
determining the phase gradient information comprises:
successively disabling contribution of respective receiver branches to the timing recovery while allowing unconstrained equalization by respective adaptive equalizers in the corresponding receiver branches,
when contribution of a particular receiver branch to timing information recovery is disabled,
i) determining a first performance metric of the receiver branch with the input signal sampled at the current sampling phase,
ii) skewing the sampling clock in a first direction to determine a second performance metric of the receiver branch with the input signal sampled at a sampling phase skewed in the first direction from the current sampling phase, and
iii) determining a third performance metric of the receiver branch with the input signal sampled at a sampling phase skewed in a second direction from the current sampling phase, and
determining the phase gradient information based on whether the second receiver performance metric or the third receiver performance metric indicates better performance of the receiver device than the first receiver performance metric, on average, for the time-interleaved receiver branches.

10. The method of claim 9, wherein:
determining the phase gradient information further comprises determining a direction in which previously constrained coefficients in the respective adaptive equalizers in time-interleaved receiver branches moved, on average, when allowed to freely adapt to provide the performance of the receiver device, and
updating the one or more adaptation constraints of the adaptive equalizer comprises adjusting values of constrained coefficient of one or more taps of the adaptive equalizer by an adaptation step in the determined direction.

11. A receiver device, comprising:
front end circuitry configured to receive an input signal;
a sampler device configured to sample the input signal the input signal to generate a sampled input signal, the sampling being performed at a current sampling phase;
an adaptive equalizer configured to:
equalize the sampled input signal to generate an equalized input signal, and
adapt, based at least in part on the equalized input signal, one or more parameters of the adaptive equalizer, the adaptation of the one or more parameters being performed under one or more adaptation constraints; and
an adaptation constraint controller configured to:
determine phase gradient information indicative of an offset of the current sampling phase from an optimal sampling phase for the receiver device, the optimal sampling phase corresponding to an estimated peak of the input signal, and
update the one or more adaptation constraints of the adaptive equalizer based on the phase gradient information to move the current sampling phase of the receiver device towards the optimal sampling phase.

12. The receiver device of claim 11, further comprising:
a timing recovery controller configured to:
recover timing information from the equalizer output signal, and
adjust, based on the timing information recovered from the equalized input signal, timing of the sampling clock to adjust the current sampling phase, wherein updating the one or more adaptation constraints causes the timing recovery circuitry to move the current sampling phase towards the optimal sampling phase.

13. The receiver device of claim 11, wherein the adaptation constraint controller is configured to:
determine a current channel response estimate corresponding to the input signal sampled at the current sampling phase,
determine one or more skewed channel response estimates corresponding to the input signal sampled at one or more sampling phases that are skewed relative to the current sampling phase, and
determine the phase gradient information as a function of the current channel response estimates and the one or more skewed second channel response estimates.

14. The receiver device of claim 13, wherein the adaptation constraint controller is configured to:
determine the current channel response estimate at least by i) obtaining first samples of the input signal at the current sampling phase and ii) convolving the first samples of the input signal with corresponding transmitted symbol decisions made by the receiver device, and
determine one or more skewed channel response estimates at least by i) obtaining second samples of the input signals at the one or more sampling phases skewed relative to the current sampling phase and ii) convolving the second samples of the input signal with the corresponding transmitted symbol decisions made by the receiver device.

15. The receiver device of claim 14, wherein:
the sampler device comprises at least a first sampling branch in a data path of the receiver device, the at least the first sampling branch configured to sample the input signal at the current sampling phase, and
an additional sampling branch outside the data path of the receiver device, wherein
the adaptation constraint controller is configured to obtain the second samples of the input signal by skewing a sampling clock of the additional sampling branch.

16. The receiver device of claim 14, wherein the adaptation constraint controller is configured to obtain the second samples of the input signal at least by interpolating between first samples obtained at the current sampling phase to estimate the second samples at the one or more sampling phases skewed with respect to the current sampling phase.

17. The receiver device of claim 13, wherein the adaptation constraint controller is configured to:
determine the phase gradient information as a function of the current channel response estimate and the one or more skewed channel response estimates determining a direction of a slope of the channel response at the current sampling phase based on identifying a maximum one among i) a main tap of the current channel response estimate corresponding to the current sampling phase ii) a main tap of a first skewed channel response estimate corresponding to a sampling phase skewed in a first direction relative to the current sampling phase and iii) a main tap of a second skewed channel response estimate corresponding a sampling phase skewed in a second direction relative to the current sampling phase, and
update the one or more adaptation constraints of the adaptive equalizer at least by adjusting values of constrained coefficient of one or more taps of the adaptive equalizer by an adaptation step in a direction opposite of the slope of the channel response.

18. The receiver device of claim 13, wherein the adaptation constraint controller is configured to:
determine, based on i) the current channel response estimate, ii) a first skewed channel response estimate and iii) a second skewed channel response estimate, whether i) the adaptive equalizer is to be adapted in an unconstrained mode while allowing the clock recovery circuitry to align a phase of the clock signal with a phase of the channel response or ii) the adaptive equalizer is to be adapted in a constrained mode while allowing recovery of the clock signal from the input signal, and
in response to determining that the adaptive equalizer is to be adapted in an unconstrained mode while allowing the clock recovery circuitry to align a phase of the clock signal with a phase of the channel response,
switch operation of the adaptive equalizer to the unconstrained mode to allow the adaptive equalizer to freely adapt, and
switch input to the clock recovery circuitry to the estimate of the channel response to allow the clock recovery circuitry to align the phase of the clock signal with the phase of the channel response.

19. The receiver device of claim 11, wherein
the receiver device includes a plurality of time-interleaved receiver branches, and
the adaptation constraint controller is configured to:
successively disable contribution of respective receiver branches to the timing recovery while allowing unconstrained equalization by respective adaptive equalizers in the corresponding receiver branches,
with contribution of a particular receiver branch to timing information recovery being disabled,
i) determine a first performance metric of the receiver branch with the input signal sampled at the current sampling phase,
ii) skew the sampling clock in a first direction to determine a second performance metric of the receiver branch with the input signal sampled at a sampling phase skewed in the first direction from the current sampling phase, and
iii) determine a third performance metric of the receiver branch with the input signal sampled at a sampling phase skewed in a second direction from the current sampling phase, and
determine the phase gradient information based on whether the second receiver performance metric or the third receiver performance metric indicates better performance of the receiver device than the first receiver performance metric, on average, for the time-interleaved receiver branches.

20. The receiver device of claim 19, wherein the adaptation constraint controller is configured to:
determine a direction in which previously constrained coefficients in the respective adaptive equalizers in time-interleaved receiver branches moved, on average, when allowed to freely adapt to provide the performance of the receiver device, and update the one or more adaptation constraints of the adaptive equalizer at least by adjusting values of constrained coefficient of one or more taps of the adaptive equalizer by an adaptation step in the determined direction.

* * * * *